(12) United States Patent
Yoshida

(10) Patent No.: US 7,106,785 B2
(45) Date of Patent: Sep. 12, 2006

(54) ADAPTIVE ANTENNA RECEPTION APPARATUS WITH WEIGHT UPDATED ADAPTIVELY

(75) Inventor: Shousei Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 856 days.

(21) Appl. No.: 10/161,689

(22) Filed: Jun. 5, 2002

(65) Prior Publication Data

US 2002/0187814 A1    Dec. 12, 2002

(30) Foreign Application Priority Data

Jun. 6, 2001    (JP)    .............................. 2001/170374

(51) Int. Cl.
*H04B 1/707* (2006.01)

(52) U.S. Cl. ...................... 375/148; 375/144; 370/342; 342/378; 342/383

(58) Field of Classification Search ................ 375/148, 375/144; 370/342, 479, 355, 339; 455/561, 455/25, 68, 517, 562.1, 422.1; 343/844, 343/853; 342/375, 373, 372, 383, 377, 378
See application file for complete search history.

(56) References Cited

U.S. PATENT DOCUMENTS

| | | | | |
|---|---|---|---|---|
| 5,815,116 | A * | 9/1998 | Dunbridge et al. .......... | 342/373 |
| 6,049,307 | A * | 4/2000 | Lim ............................. | 342/383 |
| 6,064,338 | A * | 5/2000 | Kobayakawa et al. ....... | 342/378 |
| 6,232,927 | B1 * | 5/2001 | Inoue et al. .................. | 343/844 |
| 6,292,135 | B1 * | 9/2001 | Takatori et al. .............. | 342/383 |
| 6,385,181 | B1 | 5/2002 | Tsutsui et al. | |
| 6,597,678 | B1 * | 7/2003 | Kuwahara et al. .......... | 370/342 |
| 6,697,640 | B1 * | 2/2004 | Katz et al. .................... | 455/561 |
| 6,882,681 | B1 * | 4/2005 | Sano ............................ | 375/148 |
| 6,956,841 | B1 * | 10/2005 | Stahle et al. ................. | 370/342 |

FOREIGN PATENT DOCUMENTS

| | | |
|---|---|---|
| JP | 11-55216 | 2/1999 |
| JP | 291445 | 4/1999 |
| JP | 11-266180 | 9/1999 |
| JP | 11-274976 | 10/1999 |
| JP | 2000-31874 | 1/2000 |
| JP | 2000-91833 | 3/2000 |
| JP | 2001-36451 | 2/2001 |
| WO | WO97/20400 | 6/1997 |

OTHER PUBLICATIONS

Digital signal processor for digital multi-beam forming antenna in mobile communicationTanaka, T.; Chiba, I.; Miura, R.; Karasawa, Y.;Vehicular Technology Conference, 1994 IEEE 44thJun. 8-10, 1994 pp. 1507-1511 vol. 3.*

(Continued)

*Primary Examiner*—Temesghen Ghebretinsae
(74) *Attorney, Agent, or Firm*—McGinn IP Law Group PLLC

(57) ABSTRACT

An adaptive antenna reception apparatus includes a multi-beam former (1) provided in common to users, to convert antenna-corresponding spread signals received by antennas of an array antenna into beam-corresponding spread signals. A receiving and demodulating section (2) is provided for one of the users, generates beam-corresponding correlation signals at a path timing from the beam-corresponding spread signals, and generates path signals by weighting the beam-corresponding correlation signals with adaptive weights which are updated adaptively, and produces a demodulation signal for the one user by combining the path signals.

20 Claims, 12 Drawing Sheets

OTHER PUBLICATIONS

Channel capacity improvement by means of two-dimensional RAKE for DS/CDMA systems Inoue, T.; Karasawa, Y.; Vehicular Technology Conference, 1998. VTC 98. 48th IEEE vol. 2, May 18-21, 1998 pp. 786-790 vol. 2.*

Beam space adaptive array based on subband signal processing Kamiya, Y.; Karasawa, Y.; Antennas and Propagation for Wireless Communications, 1998. 1998 IEEE-APS Conference on Nov. 1-4, 1998 pp. 41-44.*

* cited by examiner

F I G. 1 0
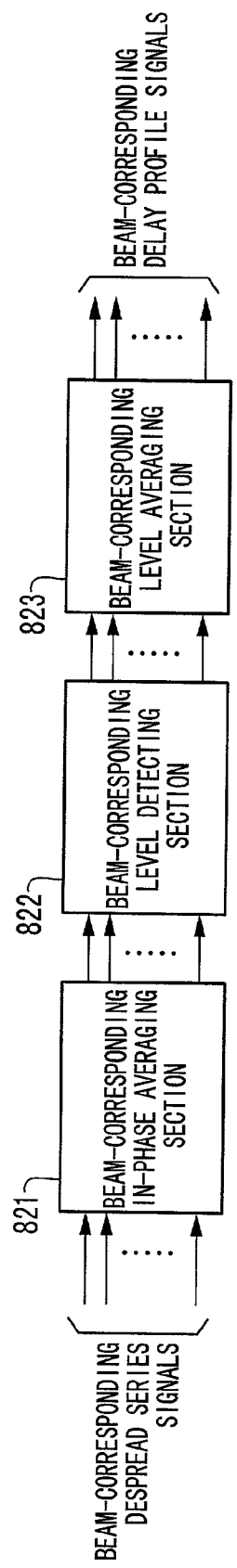

ADAPTIVE ANTENNA RECEPTION APPARATUS WITH WEIGHT UPDATED ADAPTIVELY

BACKGROUND OF THE INVENTION

1. Field of the Invention

The present invention relates to an adaptive antenna reception apparatus. More particularly, the present invention relates to an adaptive antenna reception apparatus, which receives a CDMA (Code Division Multiple Access) signal as a multi-beam signal with adaptively controlled weights.

2. Description of the Related Art

A CDMA system has a possibility that a capacity of subscribers can be increased, and is expected as a radio access system of a mobile communication celler system. However, there is a problem that a signal from another user accessing at the same time functions as an interference signal in a base station receiving end. An adaptive array antenna reception apparatus is known as a method of receiving only a desired signal while removing the interference signals. The adaptive array antenna reception apparatus receives a signal by a plurality of antennas, carries out a weighting operation using complex numbers and a combining operation to control the amplitude and phase of the reception signal of each antenna and to form a directional beam for reception of a desired user signal, and for suppression of the other user interference signals.

FIG. 1 shows a circuit structure of a first conventional example of an adaptive antenna reception apparatus. Referring to FIG. 1, the first conventional example of the adaptive antenna reception apparatus is comprised of a path detecting section 200 and a receiving and demodulating section 100. A CDMA signal is received by an array antenna (not shown). A component of the CDMA received by each of antennas of the array antenna is referred to as an antenna-corresponding multiple spread signal hereinafter. The path detecting section 200 detects the timings of paths of the multi-path from the antenna-corresponding multiple spread signals. The receiving and demodulating section 100 carries out a despreading operation for each path to the antenna-corresponding multiple spread signals at the detected path timings, adaptively forms a directional beam signal for every path from the despread signals, and combines the directional beam signals to produce a demodulation signal.

The path detecting section 200 is comprised of a sliding correlation unit 201, a delay profile generating section 202, a delay profile combining section 203 and a path timing detecting section 204.

The sliding correlation unit 201 carries out the despreading operation to the antenna-corresponding spread signals over a plurality of chips in the resolution of 1/NR of a chip period (NR is a positive integer) and outputs sequences of despread signals. The delay profile generating section 202 vector-averages the sequences of despread signals for the respective antennas outputted from the sliding correlation units 201 in in-phase to calculate the signal level (amplitude or power), and carries out an averaging operation for an optionally predetermined time period. Thus, the antenna-corresponding delay profile generating section 202 produces antenna-corresponding delay profiles averaged for the predetermined time period for the respective antennas.

The delay profile combining section 203 combines the antenna-corresponding delay profiles to produce one delay profile. The path timing detecting section 204 detects a plurality of path timings from the delay profile and the path times are used in the receiving and demodulating section 100. The path timing detecting section 204 selects the timings of the paths with larger levels from the delay profile in order, while generally taking the path selection interval of 0.75- to 1-chip.

The receiving and demodulating section 100 is comprised of L (L is a positive integer) path reception sections (#1 to #L) 110-1 to 110-L for the number of paths of a multi-path, a combining unit 120, a decision unit 130, a switch 140, and a subtractor 150. The path (#1 to #L) receiving sections 110-1 to 110-L have the same structure and carry out the same operation. Therefore, the circuit structure and operation of the path (#i) receiving section 110-i ($1 \leq i \leq L$) will be described. The path (#i) receiving section 110-i is comprised of a correlation unit 111-i, a beam former 112-i, a rake combining and weighting section 113-i, a normalizing section 114-i, a multiplier 115-i, and an antenna weight adaptive control section 116-i.

The correlation unit 111-i carries out a despreading operation to the antenna-corresponding spread signals at the path timings detected by the path timing detecting section 204. The beam former 112-i receives the outputs of the correlation unit 111-i with an antenna directionality by using antenna weights peculiar to the users and generated adaptively, and outputs a path-corresponding directional beam signal. The rake combining and weighting section 113-i carries out a weighting operation to the path-corresponding directional beam signal to correct a phase change. Also, the rake combining and weighting section 113-i carries out the weighting operation for SINR (desired signal power vs. interference noise power ratio) after the path combining to be maximized (maximum ratio combining).

The combining unit 120 adds the outputs of the rake combining and weighting sections 113-1 to 113-L for path combining and outputs a high quality demodulation signal. The decision unit 130 determines a transmission signal with a high transmission possibility from the demodulation signal. The switch 140 carries out a switching operation to use a known reference signal as a reference signal when there is the known reference signal and to use the output of the decision unit 130 as the reference signal when there is not any known reference signal. The subtractor 150 subtracts the demodulation signal from the reference signal and generates an error signal. The error signal generated by the subtractor 150 is distributed to the path (#1 to #L) receiving section 110-1 to 110-L, respectively.

The normalizing section 114-i carries out a normalization operation to channel estimation signal estimated by the rake combining and weighting section 113-i. Here, the normalizing section 114-i can be omitted to reduce a calculation quantity. The multiplier 115-i multiplies the error signal and the normalized channel estimation signal.

The antenna weight adaptive control section 116-i updates the antenna weights adaptively, by using the outputs of the correlation unit 111-i and the outputs of the multiplier 115-i. Minimum mean square error (MMSE) control is generally used in the antenna weight adaptive control section 116-i. In the MMSE control, the directionality is directed to the desired user signal and the control is carried out to maximize the SINR. As the adaptive update algorithm using the determination error signal, there are known LMS (Least Mean Square) algorithm and RLS (Recursive Least Square) algorithm.

In the first conventional example of the adaptive antenna reception apparatus shown in FIG. 1, the weighting and combining operation is carried out directly to the antenna-corresponding reception signals from the array antenna to from the directional beam signal. In this circuit structure, however, the beam formation is not carried out in the path detecting section 200. Therefore, the path detection cannot be carried out to utilize an antenna gain. Thus, there is a problem that the path detection characteristic is degraded when the number of antennas increases.

FIG. 2 shows the circuit structure of a second conventional example of the adaptive antenna reception apparatus as a multi-beam system. Referring to FIG. 2, the second conventional example of the adaptive antenna reception apparatus is comprised of a multi-beam former 301, a path detecting and beam selecting section 400 and a receiving and demodulating section 300.

The multi-beam former 301 receives antenna-corresponding multiple spread signals as a CDMA signal received by an array antenna (not shown) and outputs beam-corresponding spread signals as multi-beam signals. The path detecting and beam selecting section 400 receives the beam-corresponding spread signals and detects the timings of paths of multi-path while selecting one of the beam-corresponding spread signals in order. The receiving and demodulating section 300 selects one of the beam-corresponding spread signals, carries out a despreading operation to the selected beam-corresponding spread signal at the detected path timing to produce a path-corresponding signal, and carries out a weighting and combining operation to the path-corresponding signals for the paths to output a demodulation signal.

The multi-beam former 301 receives the antenna-corresponding spread signals as a multi-beam signal and outputs beam-corresponding spread signals for the respective beams. In order to reduce a calculation quantity in the multi-beam system, the multi-beam former 301 is generally arranged prior to the despreading operation for every user, and carries out a multi-beam reception operation to a multiple signal in which signals from all the users are multiplexed. With this, the calculation quantity per user can be greatly reduced.

The path detecting and beam selecting section 400 is comprised of a sliding correlation unit 401, a delay profile generating section 402, a path timing detecting section 403 and a path timing detecting section 404.

The sliding correlation unit 401 carries out a despreading operation to the beam-corresponding spread signals over a plurality of chips in the resolution of 1/NR (NR is a positive integer) of chip period, and outputs sequences of despread signals. The delay profile generating section 402 vector-averages the sequences of despread signals for the respective beams from the sliding correlation unit 401 in-phase, calculates the level (amplitude or power) of the signals, and carries out averages over an optionally predetermined time period. Thus, beam-corresponding delay profiles are obtained.

The path timing detecting section 403 detects a plurality of beam-corresponding path timings from the beam-corresponding delay profiles independently for every beam. The path timing detection is generally carried out to select timings of the paths with larger levels from the beams-corresponding delay profiles in order while taking the path selection interval of 0.75- to 1-chip. The path timing detecting section 404 collects the beam-corresponding path timings detected by the path timing detecting section 403, selects the timings of the paths with a plurality of larger levels from the collected beam-corresponding path timings and outputs sets of the selected path timing the beam number of the selected path timing.

The receiving and demodulating section 300 is comprised of L path (#1 to #L) receiving sections 310-1 to 310-L for the number of paths and a combining unit 320. The path (#1 to #L) receiving section 310-1 to 310-L have the same circuit structure and carry out the same operation. Therefore, the path receiving section 310-i ($1 \leq i \leq L$) will be described. The path receiving section 310-i is comprised of a switch 311-i, a correlation unit 312-i, and a rake combining and weighting section 313-i.

The switch 311-i carries out a switching operation based on the beam number outputted from the beam/path timing detecting section 404 to select one from among the beam-corresponding spread signals. The correlation unit 312-i carries out a despreading operation to the selected spread signal at the path timing selected by the path timing detecting section 404.

The rake combining and weighting section 313-i carries out a weighting operation to the output of the correlation unit 311-i to correct a phase change. Also, the rake combining and weighting section 313-i carries out the weighting operation for SINR after the path combining so as to be maximized (maximum ratio combining). The combining unit 32 adds the outputs of the rake combining and weighting section 313-1 to 313-L for path combining and outputs a high quality demodulation signal.

In the adaptive antenna reception apparatuses of the circuit structure as described above, the path detecting and beam selection section 400 carries out the path detection using the beam-corresponding spread signals formed by the multi-beam former 301. Therefore, the path detection characteristic never degrades even when the number of antennas is larger.

However, in the first conventional example of the adaptive antenna reception apparatus shown in FIG. 1, the beam forming is not carried out in the path detecting section 200. Therefore, the path detection cannot be carried out to utilize an antenna gain. For this reason, the path detection characteristic degrades when the number of antennas becomes larger. Also, the path detecting section 200 cannot generate the initial antenna weights used in the beam formers 112-1 to 112-L of the receiving and demodulating section 100, at the same time as the path timing detection.

Also, the second conventional example of the adaptive antenna reception apparatus shown in FIG. 2 can solve the above-mentioned problem. In this structure, however, the receiving and demodulating section 300 processes the beam-corresponding spread signal selected from the outputs of the multi-beam former 301. Therefore, the adaptive beam forming cannot be achieved in which reception SINR is maximized, unlike the receiving and demodulating section 100 shown in FIG. 1 in which the antenna-corresponding signal is directly received.

In conjunction with the above description, an array antenna system of a radio base station is disclosed in Japanese Laid Open Patent application (JP-A-Heisei 11-266180). In the array antenna system of the radio base station for CDMA mobile, a beam former (12) carries out beam forming to a multi-path signal received by a plurality of antenna elements of the array antenna (11) to form a plurality of beams (B1 to B4), which are supplied to despreading/delay adjusting sections (finger sections) (131 to 13k) provided for the respective paths of the multi-path. Each of the finger sections carries out a despreading operation to a corresponding one of the plurality of beams. A beam selector (15) selects ones having larger signal components from among the despread signals for all the beams of all the paths. A combining section (17) combines the selected despread signals with weights, and a determining section (18) identifies data based on the combined signal. A searcher measures a time interval between the multi-path signals and supplies a despreading operation start timing and a delay time signal to the despreading/delay adjusting section provided every path of the multi-path.

Also, an adaptive array diversity receiver is disclosed in Japanese Laid Open Patent Application (JP-P2000-31874A). In this reference, a reception circuit phase-detects each of reception signals outputted from a plurality of antenna and outputs phase baseband signals according to the phases of the reception signals or time difference values between the phases of the reception signals. A phase error detecting section subtracts the phases of a half of ideal symbol points when there are no noise, interference, and distortion from the phase baseband signal, and outputs phase errors with sign to the half of the ideal symbol points. An absolute value calculating section outputs an absolute value of each of the phase errors with the sign as a phase error for each branch. A weight calculating section outputs weights according to each of the reception signals. A weighting section weights and adds the phase errors of the respective branches with the weights. A first combining section adds and combines the phase errors of the respective branches weighted by the weighting section, and outputs a first combined phase error to the half of the ideal symbol points for every point of the half of the ideal symbol points. A second combining section adds the weights, subtracts the first combining phase error from the weight, and outputs a second combining phase error to a remaining half of the ideal symbol points for every ideal symbol point of the remaining half. The remaining half of the ideal symbol points have the different phases from the half of the ideal symbol points by the phase of $\pi$ radian. A determining section determines the ideal symbol points corresponding to the smallest one of the first and second combined phase errors, and outputs codes corresponding to the determined ideal symbol points as demodulation data. The weight calculating section updates the combined weights in accordance with the reception signal strength of each of the reception signals, the first or second combined phase errors of the ideal symbol points corresponding to the reference data, and each branch phase error of the ideal symbol points corresponding to the reference data. The reference data is known data contained in the demodulation data or a transmission signal from said determining section.

Also, an array antenna reception apparatus is disclosed in Japanese Laid Open Patent Application (JP-P2000-91833A). In this reference, the array antenna reception apparatus gives a signal received by a plurality of antenna elements provided in parallel an optional amplitude and a phase rotation to form a desired antenna pattern. An analog beam former inputs an output signal of each antenna element and combines beams such that the phase difference between the adjacent output beams shows a constant value which is decided depending on the selected output beams. A plurality of receivers change the respective output signals of the beam former into digital signals. A phase correcting section converts the digital signal into a digital signal which a phase correction quantity is given the output signal of each receiver such that the phase difference between the antenna elements is a constant value. The phase correcting section is comprised of a calculating section and a plurality of phase rotating sections. The calculating section multiplies digital signals between the adjacent beams, and subtracts the constant value from the multiplying result to determine the phase correction quantity, and adds the phase correction quantity to the phase correction quantity determined from the digital signal between the following adjacent beams. The plurality of phase rotating sections phase-rotate the digital signal by the phase correction quantity except for one as a reference.

Also, a path search circuit in a CDMA cellular system is disclosed in Japanese Laid Open Patent Application (JP-P2001-36451A). In this reference, the path search circuit is comprised of an antenna section of a plurality of elements. A plurality of radio receiving sections frequency-converts a radio Frequency signal received by each element of the antenna section into a baseband signal. An analog-to-digital converter converts each baseband signal into digital data. A plurality of correlation calculating sections calculate the mutual correlations of the baseband signals and known signals on the receiving end, and outputs correlation signals. A weighting average calculating section carries out a weighting and adding operation to the correlation signals outputted from the correlation calculating sections based on specified weighting coefficients and carries out an averaging operation for a predetermined number of times. A correlation peak detecting section detects one or more peaks from among the correlation signals after the weighting and averaging operation as a delay profile outputted from the weighting and averaging section, and outputs a reception timing and a reception level corresponding to the detected peak as the reception timing and the reception level of the reception path. A weighting control unit sets a directionality of the antenna section by controlling the weighting coefficients, and generates the plurality of weighting coefficients to form a plurality of antenna directionalities to divide a sector where a mobile terminal as a communication end is present.

Also, a CDMA adaptive receiving apparatus is disclosed in Japan patent No. 2,914,445. In this reference, the CDMA adaptive receiving apparatus is comprised of a set of the weighting and combining section and the weight control section for every user, and an error generating section. The weighting and combining section carries out a weighting and combining operation corresponding to the input of each of N antennas which receive a code division multiple access signal. The weight control section outputs antenna weighting coefficients for the weighting operation. The error generating section generates M error signals corresponding to the respective paths to desired signal from a channel estimation signal and M demodulation signals demodulated at timings corresponding to M paths of a multi-path from the reception signal outputted from the weighting and combining section, and combines the error signals to output to the weight control section.

Also, a diversity reception apparatus is disclosed in International Patent application WO97/20400. In the diversity reception apparatus of this reference, a correlation unit despreads a plurality of fading reception waves for every branch, when a data signal which has been transmitted in a direct CDMA system is received. A plurality of multipliers multiply despread signals and weight coefficients. The diversity reception apparatus is comprised of an identification section which reproduces the data signal, and a weight coefficient calculating section which uses an identification error signal which is obtained from an input signal to the identification section and an output from the identification section, as feedback data for controlling the weight coefficients.

SUMMARY OF THE INVENTION

Therefore, an object of the present invention is to provide an adaptive antenna reception apparatus, in which a calculation quantity can be greatly reduced.

Another object of the present invention is to provide an adaptive antenna reception apparatus, in which an excellent path detection characteristic and reception demodulation characteristic can be realized.

In an aspect of the present invention, an adaptive antenna reception apparatus includes a multi-beam former and a receiving and demodulating section. The multi-beam former is provided in common to users, to convert antenna-corresponding spread signals received by antennas of an array antenna into beam-corresponding spread signals. The receiving and demodulating section is provided for one of the users. The receiving and demodulating section generates beam-corresponding correlation signals at path timings from the beam-corresponding spread signals, and generates path signals by weighting the beam-corresponding correlation signals with adaptive weights which are updated adaptively, and produces a demodulation signal for the one user by combining the path signals.

Here, the multi-beam former may include groups of former multipliers and former combining circuits. The groups of former multipliers are respectively provided for beam patterns of the array antenna. Each of the former multipliers of each of the groups multiplies one of the antenna-corresponding spread signals and a predetermined beam weight to produce the beam-weighted spread signal. Each of the former combining circuits is provided for the group to combine the beam-weighted spread signals of the group to produce one of the beam-corresponding spread signals.

Also, the receiving and demodulating section may include receiving sections, a reception combining unit and an error signal generating section. Each of the receiving sections is provided for one of paths. The receiving section generates the beam-corresponding correlation signals at the path timing from the beam-corresponding spread signals, generates one of the path signals for the path by weighting the beam-corresponding correlation signals with the adaptive weights, and updates the adaptive weights based on the beam-corresponding correlation signals and an error signal. The reception combining unit is provided for receiving sections, to combine the path signals from the receiving sections to output the demodulation signal. The error signal generating section generates the error signal from the demodulation signal or a known reference signal to represent a difference between the demodulation signal and a transmission estimation signal from the one user or the known reference signal and distributes the error signal to the receiving sections.

In this case, the error signal generating section may include a determining section, a switch and a subtractor. The determining section determines the transmission estimation signal from the demodulation signal. The switch selects as a reference signal, one of the known reference signal and the transmission estimation signal. The subtractor subtracts the demodulation signal from the reference signal to generate the error signal and distributes the error signal to the receiving sections.

Also, the receiving section may include a correlation unit, a weighting and combining section, a rake combining and weighting section, a reception multiplier and a weight adaptive control section. The correlation unit calculates correlations of the beam-corresponding spread signals at the path timing to produce beam-corresponding correlation signals. The weighting and combining section weights the beam-corresponding correlation signals outputted from the correlation unit with the adaptive weights and combines weighted beam-corresponding correlation signals to produce a weighted path signal. The rake combining and weighting section carries out a weighting operation to the weighted path signal to correct a phase change to generate the path signal and estimates a channel estimation signal from the weighted path signal. The reception multiplier multiplies the error signal and the channel estimation signal. The weight adaptive control section updates the adaptive weights based on the beam-corresponding correlation signals and an output of the reception multiplier.

In this case, the receiving section may further include a normalizing section which is provided between the rake combining and weighting section and the reception multiplier to carry out a normalizing operation to the channel estimation signal estimated by the rake combining and weighting section. The reception multiplier multiplies the error signal and an output of the normalizing section in place of the channel estimation signal.

Also, the weighting and combining section may include weighting complex conjugate calculating circuits, weighting multipliers, and a weighting and combining circuit. The weighting complex conjugate calculating circuits calculates complex conjugates of the adaptive weights. The weighting multipliers multiply the beam-corresponding correlation signals and the complex conjugates of the adaptive weights. The weighting and combining circuit combines outputs of the weighting multipliers to produce the weighted path signal.

Also, the rake combining and weighting section may include a channel estimating section, a rake complex conjugate calculating circuit and a rake multiplier. The channel estimating section estimates the channel estimation signal from the weighted path signal. The rake complex conjugate calculating circuit calculates a complex conjugate of the channel estimation signal. The rake multiplier multiplies the weighted path signal and the complex conjugate of the channel estimation signal to produce the path signal.

Also, the rake combining and weighting section may include a channel estimating section, a rake complex conjugate calculating circuit, a first rake multiplier, an interference power estimating section, an inverse value calculating section and a second rake multiplier. The channel estimating section estimates the channel estimation signal from the weighted path signal. The rake complex conjugate calculating circuit which calculates a complex conjugate of the channel estimation signal. The first rake multiplier multiplies the weighted path signal and the complex conjugate of the channel estimation signal to produce the path signal. The interference power estimating section calculates interference power from the weighted path signal. The inverse value calculating section calculates an inverse number of the interference power. The second rake multiplier multiplies an output of the first rake multiplier and an output of the inverse value calculating section.

The adaptive antenna reception apparatus may further include a path detecting section which detects the path timings from the beam-corresponding spread signals and outputs the path timing to the receiving sections.

In this case, the path detecting section may include a sliding correlation unit, a delay profile generating section, a delay profile combining section and a path timing detecting section. The sliding correlation unit carries out a despreading operation to the beam-corresponding spread signals over a plurality of chips and outputs sequences of beam-corresponding despread signals. The delay profile generating section generates beam-corresponding delay profiles from the sequences of beam-corresponding despread signals. The delay profile combining section produces one delay profile by selecting and combining one or more of the beam-corresponding delay profiles. The path timing detecting section detects the path timings from the delay profile and outputs the receiving and demodulating section.

Also, the weight adaptive control section sets initial data of the adaptive weights in response to a beam selection signal. At this time, the adaptive antenna reception apparatus may further include a path detecting section which detects said path timings from said beam-corresponding spread signals to outputs to said receiving sections, generates a delay profile and generates said beam selection signals from said delay profile and said path timings to output to said receiving sections.

Also, the receiving section may include an orthogonal multi-beam group selecting section, a correlation unit, a weighting and combining section, a rake combining and weighting section, a reception multiplier, and a weight adaptive control section. The orthogonal multi-beam group selecting section selects orthogonal ones from the beam-corresponding spread signals in response to a beam selection signal, the orthogonal beam-corresponding spread signals containing the beam-corresponding signal with a maximum level among the beam-corresponding spread. The correlation unit calculates correlations of the orthogonal beam-corresponding spread signals at the path timing to produce beam-corresponding correlation signals. The weighting and combining section weights the beam-corresponding correlation signals outputted from the correlation unit with the adaptive weights and combines weighted beam-corresponding correlation signals to produce a weighted path signal. The rake combining and weighting section carries out a weighting operation to the weighted path signal to correct a phase change to generate the path signal and estimates a channel estimation signal from the weighted path signal. The reception multiplier multiplies the error signal and the channel estimation signal. The weight adaptive control section sets initial data of the adaptive weights in response to the beam selection signal, and updates the adaptive weights based on the beam-corresponding correlation signals and an output of the reception multiplier.

In this case, the adaptive antenna reception apparatus may further include a path detecting section which detects the path timings from the beam-corresponding spread signals to outputs to the receiving sections, generates a delay profile and generates the beam selection signals from the delay profile and the path timings to output to the receiving sections.

In this case, the path detecting section may include a sliding correlation unit, a delay profile generating section, a delay profile combining section, a path timing detecting section and a beam selection signal generating section. The sliding correlation unit carries out a despreading operation to the beam-corresponding spread signals over a plurality of chips and outputs sequences of beam-corresponding despread signals. The delay profile generating section generates beam-corresponding delay profiles from the sequences of beam-corresponding despread signals. The delay profile combining section produces a delay profile by selecting and combining one or more of the beam-corresponding delay profiles, and outputs levels of the delay profile. The path timing detecting section detects the path timings from the delay profile and outputs the receiving and demodulating section. The beam selection signal generating section generates the beam selection signals from the levels of the delay profile in response to the path timings from the path timing detecting section.

In another aspect of the present invention, an adaptive antenna reception apparatus includes a multi-beam former, a receiving and demodulating section and a path detecting section. The multi-beam former is provided in common to users, to convert antenna-corresponding spread signals received by antennas of an array antenna into beam-corresponding spread signals. The receiving and demodulating section is provided for one of the users. The receiving and demodulating section generates beam-corresponding correlation signals at path timings from the beam-corresponding spread signals, and generates path signals by weighting the beam-corresponding correlation signals with adaptive weights which are updated adaptively, and produces a demodulation signal for the one user by combining the path signals. The path detecting section detects the path timings from the beam-corresponding spread signals and outputs the path timings to the receiving and demodulating section.

In still another aspect of the present invention, an adaptive antenna reception apparatus includes a multi-beam former, receiving and demodulating sections, and a path detecting section. The multi-beam former is provided in common to users, to convert antenna-corresponding spread signals received by antennas of an array antenna into beam-corresponding spread signals. The receiving and demodulating sections are provided for the users. Each of the receiving and demodulating sections generates beam-corresponding correlation signals at a path timing from the beam-corresponding spread signals, and generates path signals by weighting the beam-corresponding correlation signals with adaptive weights which are updated adaptively, and produces a demodulation signal for one of the users by combining the path signals. Initial data of the adaptive weights are set in response to the beam selection signal. The path detecting section detects the path timings from the beam-corresponding spread signals to outputs to the receiving and demodulating section, generates a delay profile and generates the beam selection signals from the delay profile and the path timings to output to the receiving sections.

BRIEF DESCRIPTION OF THE DRAWINGS

FIG. 10 is a block diagram showing the circuit structure of a delay profile generating section in the second embodiment of the present invention;

DESCRIPTION OF THE PREFERRED EMBODIMENTS

Next, an adaptive antenna reception apparatus of the present invention will be described with reference to the attached drawings.

Figure 3:
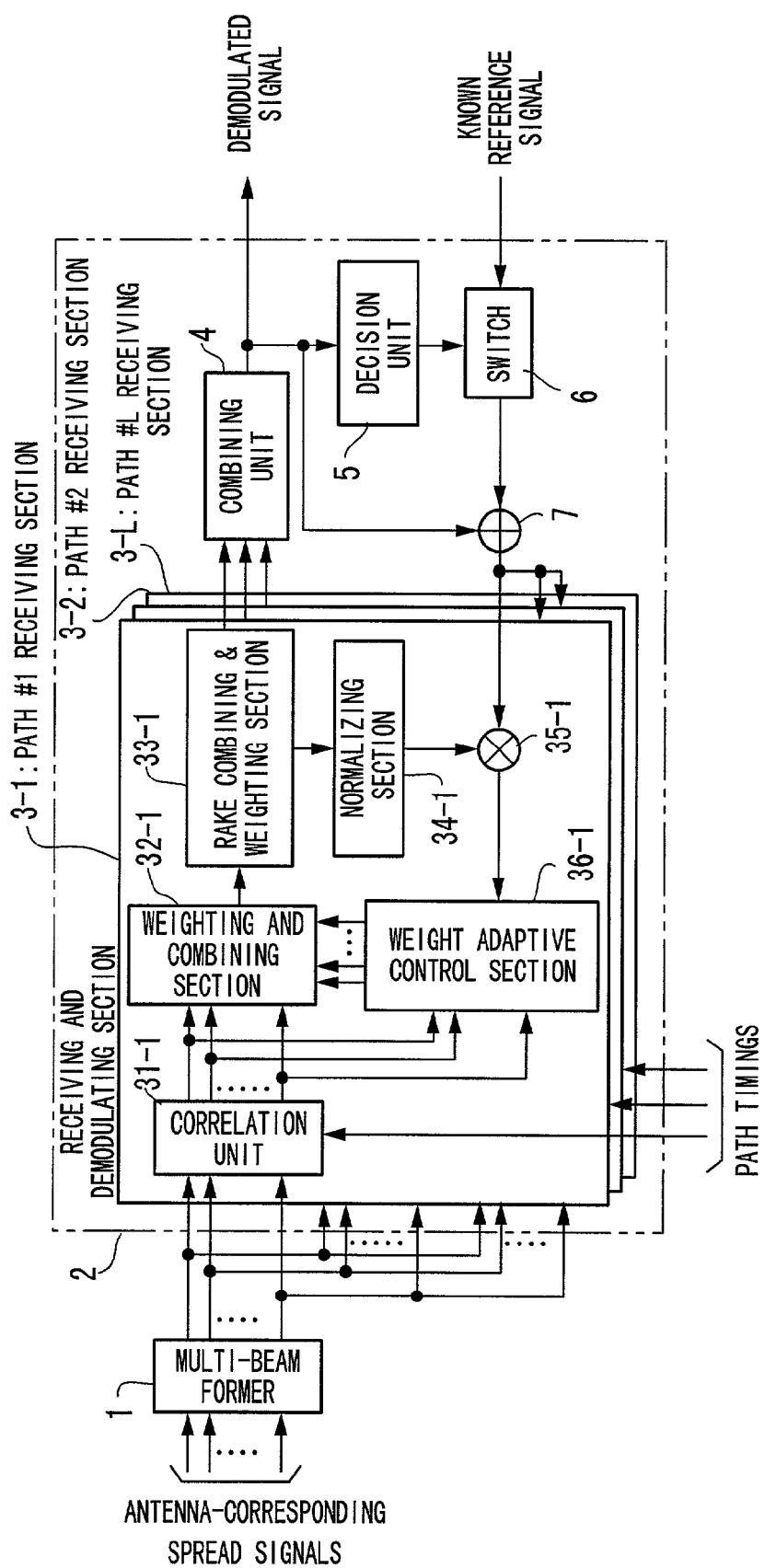
FIG. 3 is a block diagram showing the circuit structure of an adaptive antenna reception apparatus according to a first embodiment of the present invention.

FIG. 3 is a block diagram showing the circuit structure of the adaptive antenna reception apparatus according to the first embodiment of the present invention. Referring to FIG. 3, the adaptive antenna reception apparatus according to the first embodiment of the present invention has the circuit structure that all outputs of a multi-beam former 1 are weighted and combined after a despreading operation, in order to realize the same effect as in the conventional example, in the multi-beam system.

For this purpose, the adaptive antenna reception apparatus according to the first embodiment of the present invention is comprised of a multi-beam former 1 provided for all users and receiving and demodulating section 2 respectively provided for the users. The multi-beam former 1 receives antenna-corresponding spread signals, when a CDMA (Code Division Multiple Access) signal has been received by antennas of an array antenna (not shown) to output a multi-beam signal of beam-corresponding spread signals. Each of the antenna-corresponding spread signals is a spread signal for every antenna, and each of the beam-corresponding spread signals is a spread signals for every beam or every beam pattern of the array antenna. The receiving and demodulating section 2 receives the beam-corresponding spread signals, carries out correlation calculation or a despreading operation at each path timing, and outputs a demodulation signal through a weighting and combining operation.

The multi-beam former 1 receives and converts the antenna-corresponding spread signals into the beam-corresponding spread signals as the multi-beam signal. Generally, to reduce a calculation quantity in the multi-beam system, the multi-beam former 1 is arranged prior to the despreading operations for all the users, and carries out a multi-beam signal receiving operation in common to the spread signals of the CDMA signal in which signals from all the users are multiplexed. With this, it is possible to largely reduce the calculation quantity per user.

The receiving and demodulating section 2 for every user is comprised of L (L is a positive integer) path (#1 to #L) receiving sections 3-1 to 3-L for the number of paths of a multi-path propagation route (not shown), a combining unit 4, a decision unit 5, a switch 6, and a subtractor 7.

The path (#1 to #L) receiving sections 3-1 to 3-L have the same circuit structure and carry out the same operation. Therefore, the path receiving sections 3-i ($1 \leq i \leq L$) will be described below. The path receiving sections 3-i is comprised of a correlation unit 31-i, a weighting and combining section 32-i, a rake combining and weighting section 33-i, a normalizing section 34-i, a multiplier 35-i, and a weight adaptive control section 36-i.

The correlation unit 31-i despread the beam-corresponding spread signals at a path timing to produce beam-corresponding despread signals, that is, calculates correlation of the beam-corresponding spread signals with a spread code to produce beam-corresponding correlation signals.

Figure 1:
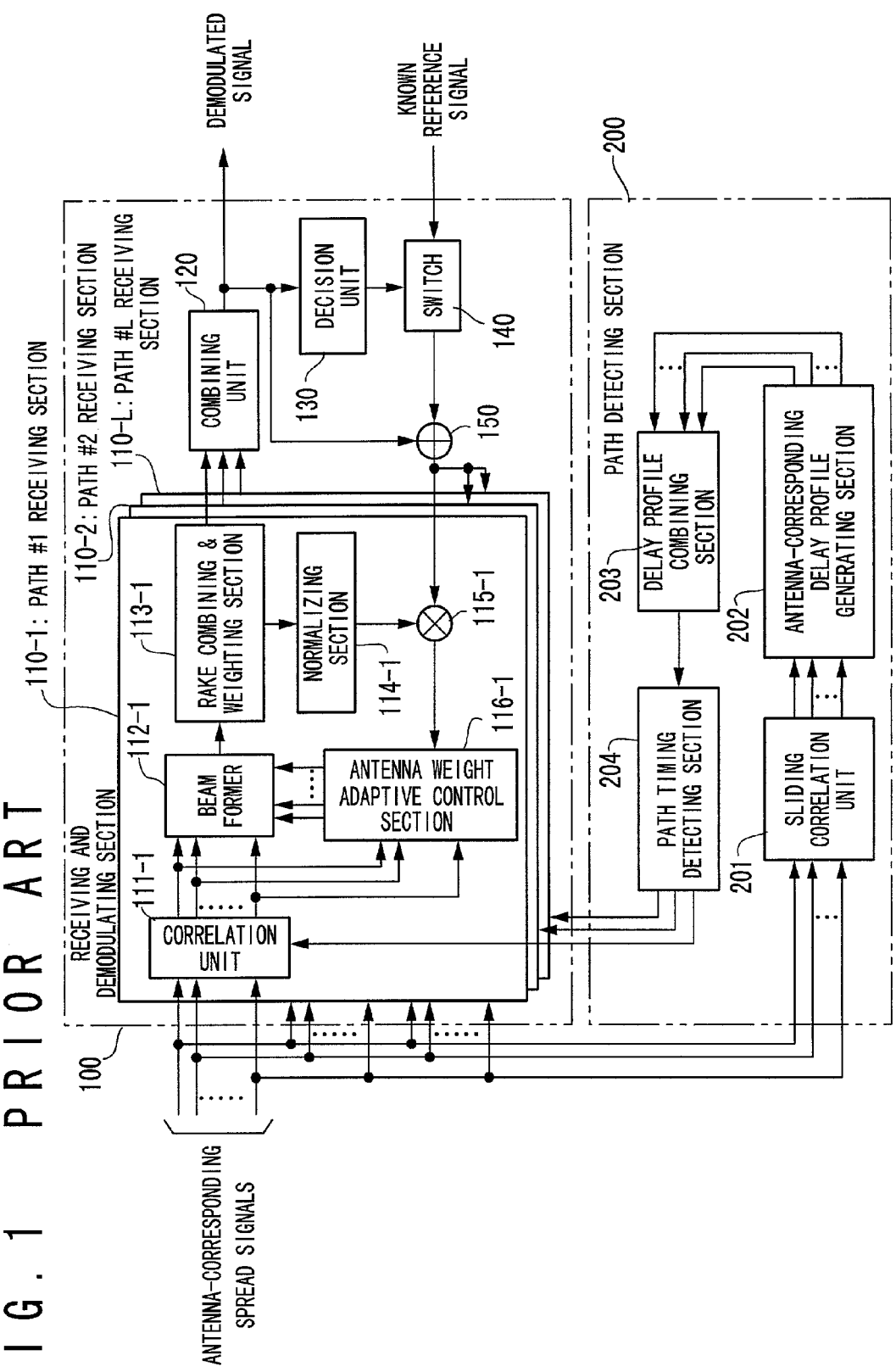
FIG. 1 is a block diagram showing the circuit structure of a first conventional example of an adaptive antenna reception apparatus.

In the first embodiment, the correlation units 31-1 to 31-L exist between the multi-beam former 1 and the weighting and combining section 32-1 to 32-L. However, because they are in a linear series combination, they operate in the same way as the operation of the beam former in the first conventional example of the adaptive antenna reception apparatus shown in FIG. 1.

The weighting and combining section 32-i weights and combines the beam-corresponding correlation signals outputted from the correlation unit 31-i using the weights peculiar to the user and controlled adaptively.

The rake combining and weighting section 33-i carries out a weighting operation to the output of the adaptive weighting and combining section 32-i for the paths #i to correct a phase change. At this time, the rake combining and weighting section 33-i carries out the weighting operation for SINR after path combining to be maximum (the maximum ratio combining). In addition, the rake combining and weighting section 33-i estimates a transmission path to produce a channel estimation signal.

The combining unit 4 adds or combines the outputs of the rake combining and weighting section 33-1 to 33-L to carry out the path combining, and outputs a high quality demodulation signal. The decision unit 5 determines a transmission signal with a high transmission possibility, i.e., the transmission signal that would be transmitted from the user, from the demodulation signal. The switch 6 selects as a reference signal, a known reference signal when there is the known reference signal, and the output of the decision unit 5 when there is not any known reference signal. The subtractor 7 subtracts the demodulation signal from the reference signal to generate an error signal. The error signal generated by the subtractor 7 is distributed to the path (#1 to #L) receiving section 3-1 to 3-L.

The normalizing section 34-i carries out a normalizing operation to the channel estimation signal estimated by the rake combining and weighting section 33-i. Here, the normalizing section 34-i may be omitted to reduce a calculation quantity.

The multiplier 35-i multiplies the error signal and the normalized channel estimation signal. The weight adaptive control section 36-i updates the weights adaptively, using the beam-corresponding correlation signals from the correlation unit 31-i and the output of the multiplier 35-i. The minimum mean square error (MMSE) control is generally used in the weight adaptive control section 36-i, to maximize the reception SINR of the desired user signal. The operation of the weight adaptive control section 36-i is basically same as the operation of the antenna weight adaptive control section in the first conventional example of the adaptive antenna reception apparatus shown in FIG. 1. There is only a difference in whether the weighted and combined signals are the antenna-corresponding signals or the beam-corresponding signals.

Algorithms such as LMS (Least Mean Square) and RLS (The recursive Least Square) are known as the adaptive update algorithm using the determination error signal. In this embodiment, an optional algorithm of these adaptive update algorithms can be used. In the circuit structure shown in FIG. 3, the determination error signal is detected using the signal after the path combining. However, a method of detecting for every path before the path combining may be used.

Also, a method of carrying out an adaptive control to carry out the weighting operation to each path in common is developed. The modification of the circuit structure is common to the present invention in that the inverse correction of the phase change is carried out to the determination error signal, which is one feature of the first embodiment of the present invention. The present invention can apply to the modification. The circuit structure of the modification is described in detail in Japanese Laid Open Patent Application (JP-A-Heisei 11-055216).

Figure 4:
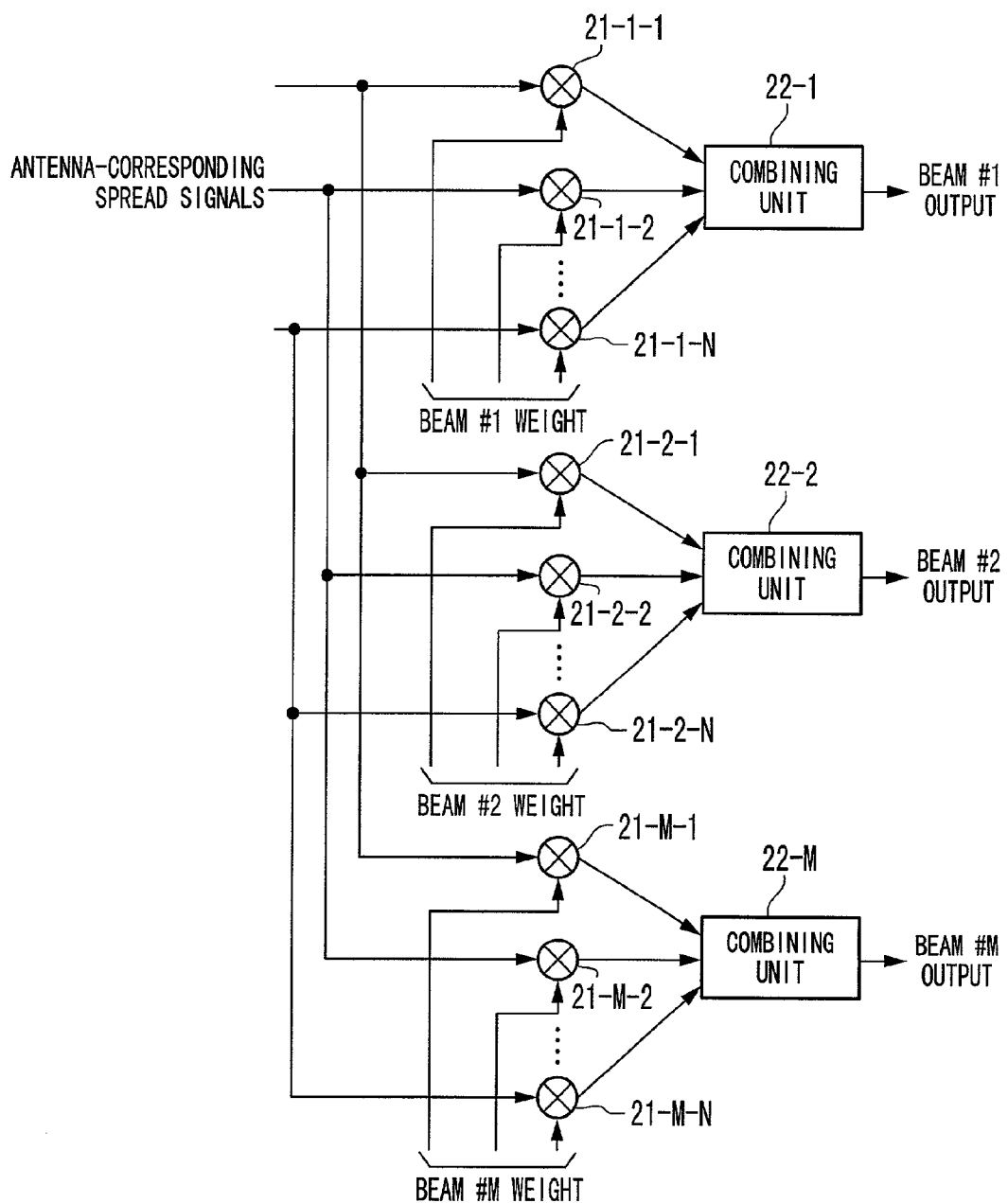
FIG. 4 is a block diagram showing the circuit structure of a multi-beam former in the embodiment of the present invention.

FIG. 4 is a block diagram showing the circuit structure of the multi-beam former 1 of FIG. 3. In FIG. 4, the multi-beam former 1 is comprised of M×N (each of M and N is a positive integer) multipliers 21-1-1 to 21-1-N, 21-2-1 to 21-2-N, 21-M-1 to 21-M-N and M combining units 22-1 to 22-M. Each of the multipliers 21-1-1 to 21-1-N, 21-2-1 to 21-2-N, 21-M-1 to 21-M-N carries out a weighting operation to a corresponding one of the antenna-corresponding spread signals with a corresponding beam weight. Each of the M combining units 22-1 to 22-M adds N outputs of the multipliers 21-1-1 to 21-1-N, 21-2-1 to 21-2-N, or 21M-1 to 21-M-N. Thus, the beam-corresponding spread signals are generated.

Figure 5A:
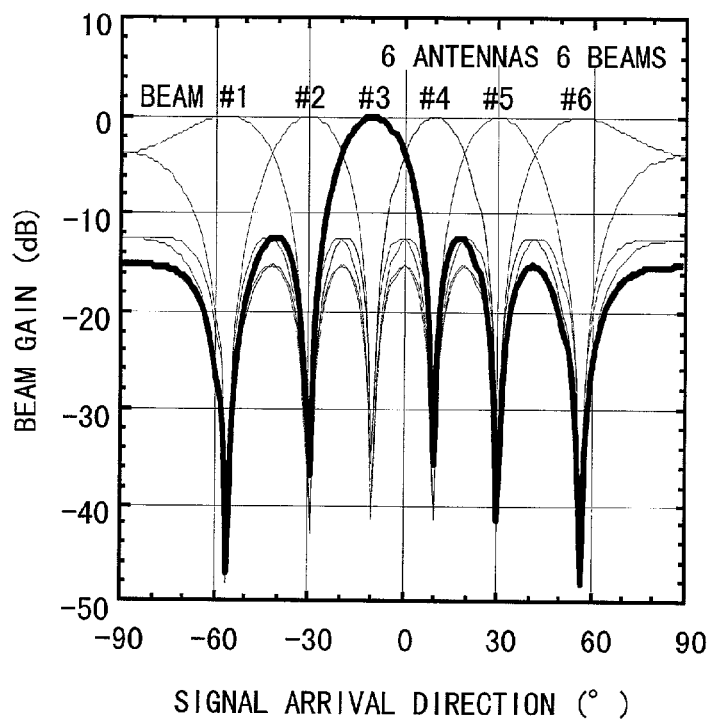
FIG. 5A is a diagram showing an orthogonal multi-beam pattern of six beams in the antenna structure in which six antennas are arranged on line.
Figure 5B:
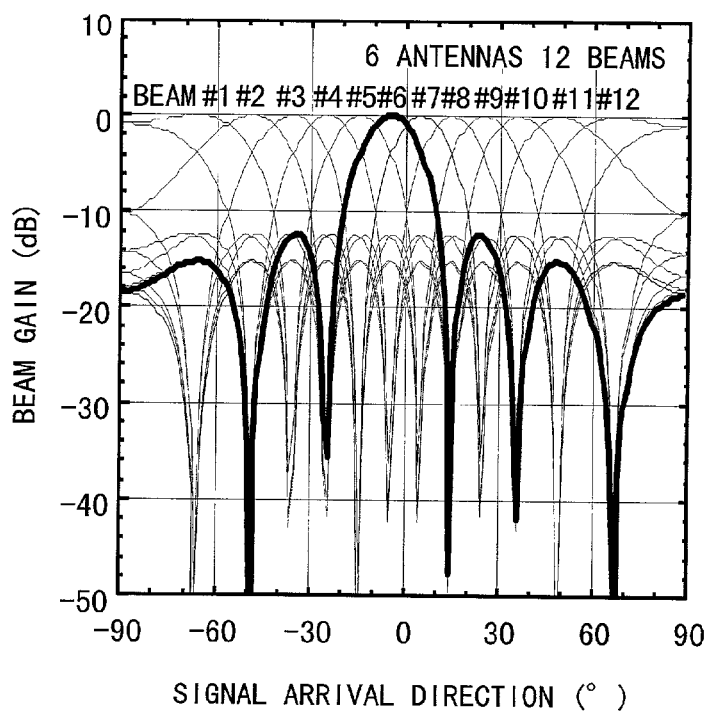
FIG. 5B is a diagram showing a pattern of 12 beams in which one beam is added between beams in FIG. 5A.

FIGS. 5A and 5B are diagrams showing a beam pattern examples of the multi-beam former 1 of FIG. 3. FIG. 5A shows an orthogonal multi-beam pattern of six beams in the antenna structure in which six antennas are arranged on a line. FIG. 5B shows a multi-beam pattern of 12 beams in which one beam is added between the beams shown in FIG. 5A.

Figure 6:
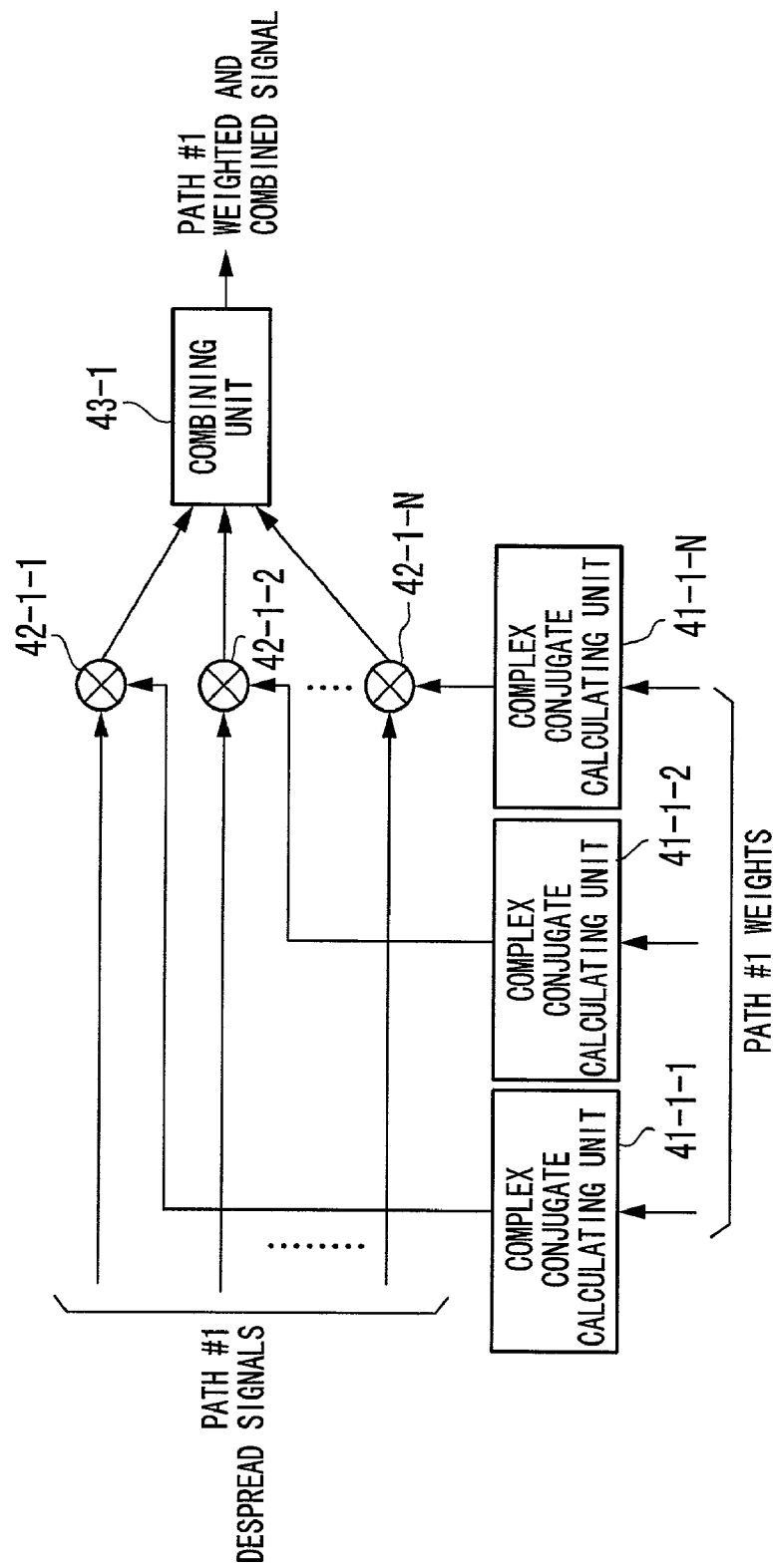
FIG. 6 is a block diagram showing the circuit structure of a weighting and combining section in the embodiment of the present invention.

FIG. 6 is a block diagram showing the circuit structure of the weighting and combining section 32-1 for the path #1 of FIG. 3. Referring to FIG. 6, the weighting and combining section 32-1 is comprised of complex conjugate calculating units 41-1-1 to 41-1-N, multipliers 42-1-1 to 42-1-N and a combining unit 43-1. The complex conjugate calculating units 41-1-1 to 411-N calculate complex conjugates of the weights of path #1. The multipliers 42-1-1 to 42-1-N multiply the beam-corresponding despread signals for the path #1 and the complex conjugates of the weights. The combining unit 43-1 adds the respective outputs of the multipliers 42-1-1 to 42-1-N. It should be noted that although being not shown, the other weighting and combining sections 32-2 to 32-L have the same circuit structure as the above-mentioned weighting and combining section 32-1.

Figure 7:
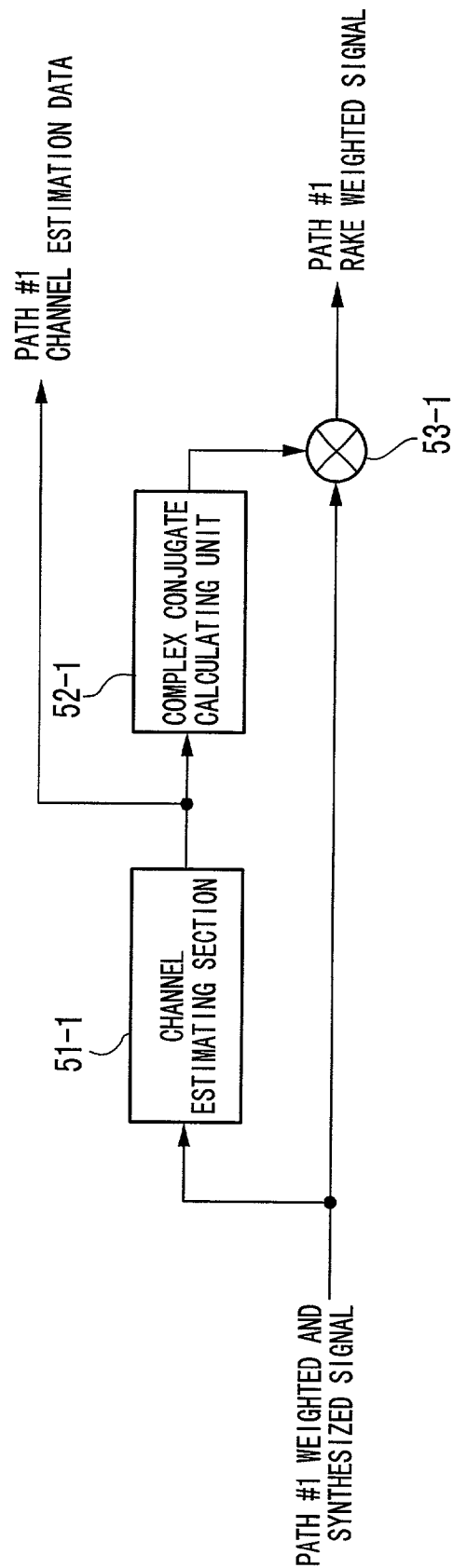
FIG. 7 is a block diagram showing the circuit structure of a rake combining and weighting section in the embodiment of the present invention.

FIG. 7 is a block diagram showing the circuit structure of the rake combining and weighting section 33-1 of the path #1 of FIG. 3. Referring to FIG. 7, the rake combining and weighting section 33-1 is comprised of a channel estimating section 51-1, a complex conjugate calculating unit 52-1, and a multiplier 53-1. The channel estimating section 51-1 estimates a transmission path from the weighting and combining signal outputted from the weighting and combining section 32-1 in the path #1 to output the channel estimation signal. The complex conjugate calculating unit 52-1 calculates a complex conjugate of the channel estimation signal of path #1. The multiplier 53-1 multiplies the weighting and combining output of path #1 and the output of the complex conjugate calculating unit 52-1, and outputs the rake combined and weighted signal.

It should be noted that although being not shown, the other rake combining and weighting sections 33-2 to 33-L has the same circuit structure as the above-mentioned rake combining and weighting section 33-1. Also, the operation of the rake combining and weighting section 33-1 shown in FIG. 7 is the weighting operation depending on the signal power of path #1.

Figure 8:
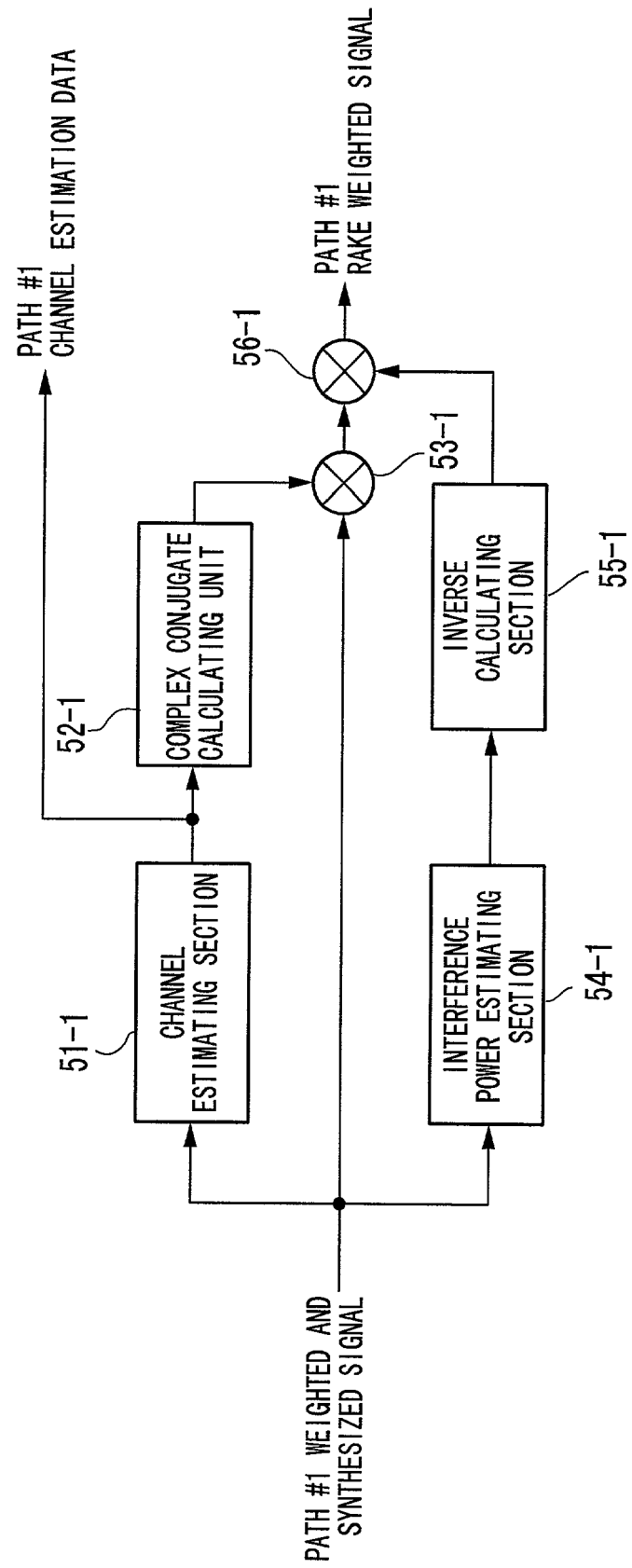
FIG. 8 is a block diagram showing another circuit structure of the rake combining and weighting section in the embodiment of the present invention.

FIG. 8 is a block diagram showing another circuit structure of the rake combining and weighting section 33-1 of the path #1 of FIG. 3. Referring to FIG. 8, the rake combining and weighting section 33-1 is comprised of a channel estimating section 51-1, a complex conjugate calculating unit 52-1, a multiplier 53-1, an interference power estimating section 52-1, an inverse number calculating operation 55-1 and a multiplier 56-1. The channel estimating section 51-1 estimates transmission path data from the weighting and combining output of path #1 to output the channel estimation signal of the path #1. The complex conjugate calculating unit 52-1 calculates a complex conjugate of the channel estimation signal of path #1. The multiplier 53-1 multiplies the weighted and combined signal of path #1 and the output of complex conjugate operation 52-1. The interference power estimating section 52-1 estimates interference power from the weighted and combined output of path #1. The inverse number calculating operation 55-1 calculates an inverse of the interference power estimation of path #1. The multiplier 56-1 multiplies the output of the multiplier 53-1 and the output of the inverse number calculating operation 55-1, and output the multiplication result as the rake combined and weighted output.

It should be noted that although being not shown, the other rake combining and weighting section 33-2 to 33-L have the same circuit structure as the above-mentioned rake combining and weighting section 33-1. Also, the operation of the rake combining and weighting section 33-1 shown in FIG. 8 is a weighting operation in accordance with SINR of path #1.

Figure 9:
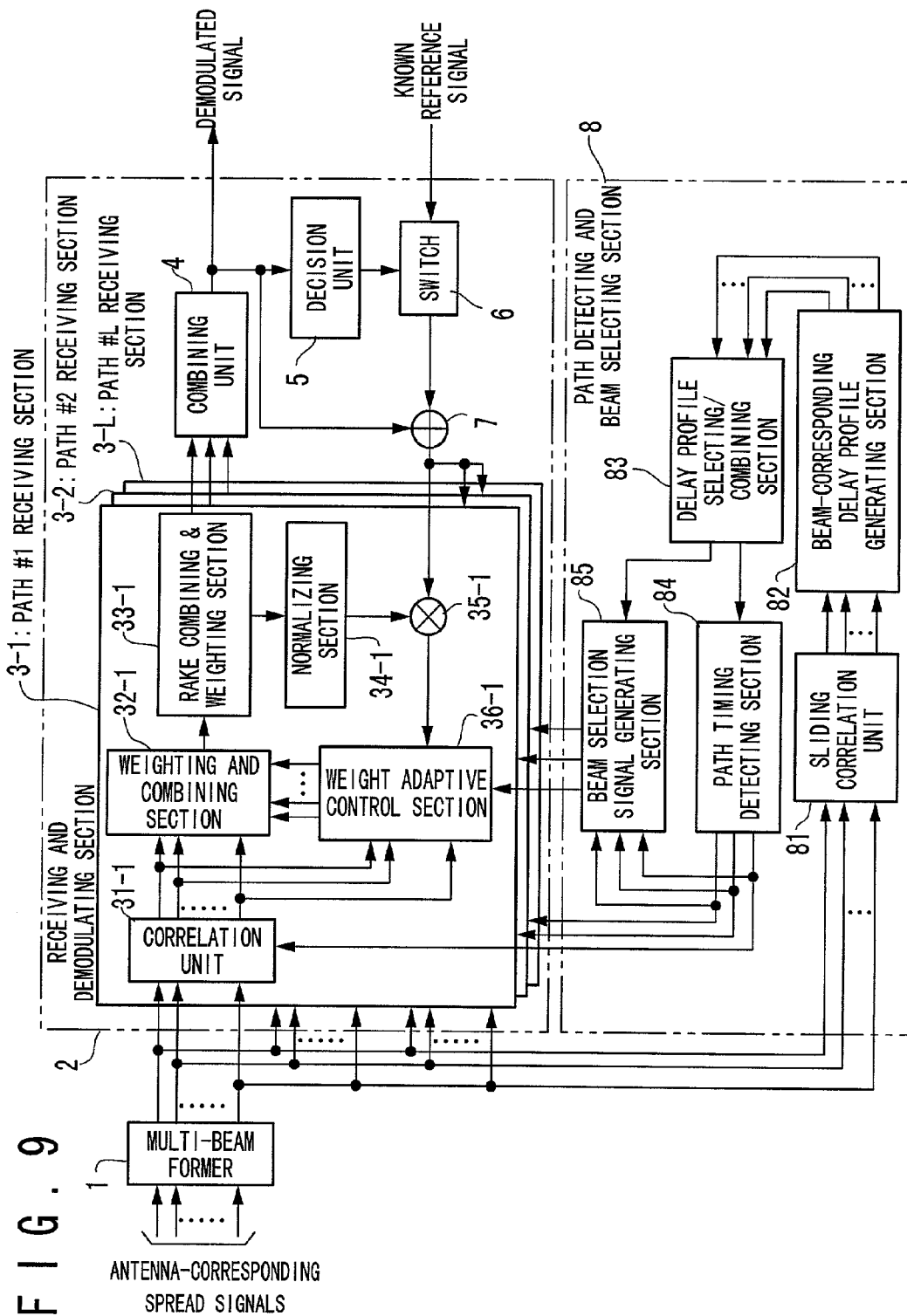
FIG. 9 is a block diagram showing the circuit structure of the adaptive antenna reception apparatus according to a second embodiment of the present invention.

FIG. 9 is a block diagram showing the circuit structure of the adaptive antenna reception apparatus according to the second embodiment of the present invention. Referring to FIG. 9, the adaptive antenna reception apparatus according to the second embodiment of the present invention has the same circuit structure as the adaptive antenna reception apparatus according to the first embodiment of the present invention shown in FIG. 3 except that a path detecting and beam selecting section 8 is added. The same reference numerals as those in the first embodiment are allocated to the same components as those in the second embodiment. Also, the operations of the same components are same as those of the first embodiment of the present invention.

That is, the adaptive antenna reception apparatus according to the second embodiment of the present invention is comprised of a multi-beam former 1, a receiving and demodulating section 2 and a path detecting and beam selecting section 8. The multi-beam former 1 receives antenna-corresponding spread signals, when a CDMA signal has been received by antennas of an array antenna (not shown) to output a multi-beam signal of beam-corresponding spread signals. The receiving and demodulating section 2 receives the beam-corresponding spread signals, carries out a despreading operation at each path timing and outputs a demodulation signal through a weighting and combining operation and phase change correction. The path detecting and beam selecting section 8 receives the beam-corresponding spread signals, carries out the path timing detection and generates a beam selection signal to generate initial weights used for the path reception in the receiving and demodulating section 2.

The multi-beam former 1 receives the antenna-corresponding spread signals and outputs the beam-corresponding spread signals as the multi-beam.

The path detecting and beam selecting section 8 is comprised of a sliding correlation unit 81, a delay profile generating section 82, a delay profile selecting/combining section 83, a path timing detecting section 84, and a beam selection signal generating section 85.

The sliding correlation unit 81 carries out a despreading operation to the beam-corresponding spread signals over a plurality of chips in the resolution of 1/NR of the chip period (NR is a positive integer), and outputs sequences of beam-corresponding despreading signals.

The delay profile generating section 82 generates beam-corresponding delay profiles, each of which is averaged for a predetermined time period using the sequences of beam-corresponding despreading signals outputted from the sliding correlation unit 81.

The delay profile selecting/combining section 83 produces one delay profile by selecting and adding one or more having larger levels from among the delay profiles. Also, the delay profile selecting/combining section 83 outputs level data of the selected/combined delay profile. The reason why the delay profile selecting/combining section 83 is an important component in the second embodiment will be described below.

Figure 2:
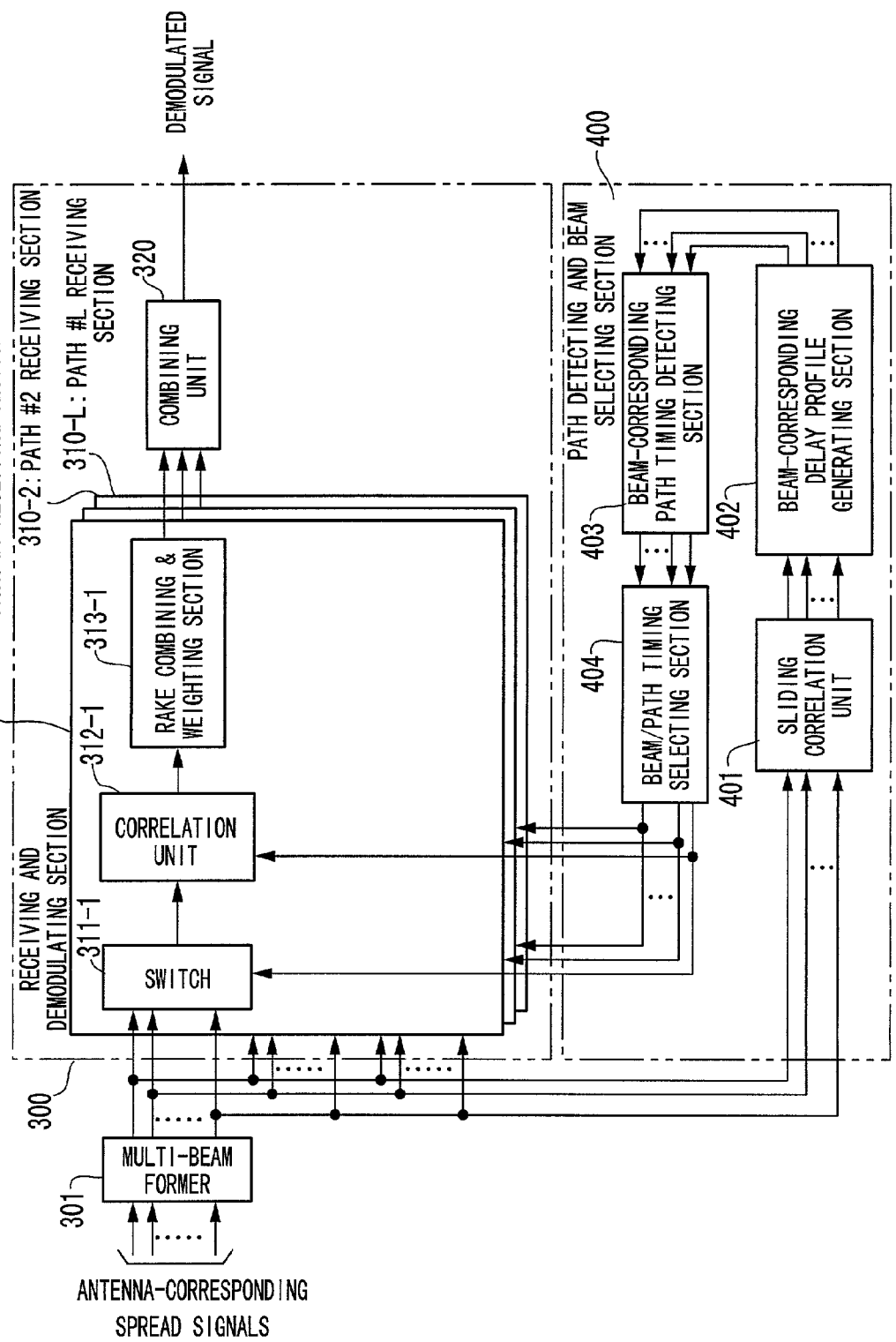
FIG. 2 is a block diagram showing the circuit structure of a second conventional example of the adaptive antenna reception apparatus.

In the path detecting and beam selecting section in the second conventional example of the adaptive antenna reception apparatus shown in FIG. 2, ones having larger levels of all the path timings detected independently for every beam and the beam numbers of the paths for the path timings are detected and notified as a set to the receiving and demodulating section 300. The receiving and demodulating section 300 combines the outputs for the selected beam signals. In this method, when a physical path is present in a middle direction between the beams, a plurality of path receiving sections are allocated to the physical path. Therefore, the respective path receiving sections 310 receives components of the signal on the physical path.

Like the conventional example, if a plurality of path receiving sections 3 are initially allocated to one physical path, the path receiving sections 3 try to receive a signal on the physical path using all the beam-corresponding signals under the adaptive control. Therefore, a state is set in which the plurality of path receiving sections 3 receive the signal on the same physical path, after convergence. Under such a state, the use efficiency of the path receiving sections 3 is degraded remarkably. It is necessary to devise to allocate each path receiving section for one physical path when an initial value should be allocated.

In the adaptive antenna reception apparatus in the second embodiment, therefore, by combining beam-corresponding delay profiles into one delay profile by the delay profile selecting/combining section 83, and then by detecting path timings from the combined delay profile, each path receiving section can be allocated to one physical path.

Some methods can be thought of for the delay profile selecting/combining section 83, and the methods would depend on the shape of the multi-beam pattern. As shown in FIG. 5B, for example, when beam patterns of the multi-beam pattern are densely arranged, there is little degradation of the level if one beam pattern is selected from the beam patterns when a signal arrives from a middle direction between the beam directions. In this case, therefore, the delay profile selecting/combining section 83 can select one for a larger level from among the M delay profiles for every path timing.

As shown in FIG. 5A, when the beam patterns of the multi-beam pattern are sparsely arranged, and the signal arrives from a middle direction between the beam patterns, degradation of the level is larger in case that one beam-pattern is selected. In the example shown in FIG. 5A, the level degrades by about 4 dB in the case that the signal arrives from the middle direction between the beam patterns. Therefore, the delay profile selecting/combining section 83 selects two for larger levels from among the M delay profiles for every timing and combines the selected delay profiles to produce one delay profile.

However, noise is added in case that the signal arrives from the peak direction of the beam pattern or that there is no path, when two delay profiles for larger levels are always selected for every path timing. Therefore, a limitation may be provided when the delay profile for the second larger level is added.

The levels becomes high in adjacent beam patterns when the signal arrives from the middle direction between the beam patterns. Therefore, the first limitation is that when the beam pattern for the second larger level is adjacent to the beam pattern for the first larger beam, the second delay profile is selected depending on a value of the second level and is used for the combining.

The second limitation is that when the second larger level is within a predetermined level from the first larger level, the delay profile for the second larger level is selected and used for the combining.

The third limitation is that when the level exceeds an average noise level of the M delay profiles by a predetermined level, the delay profile for the second larger level is selected and used for the combining.

These limitations may be used in an optional combination. The method using the second limitation or the third limitation can be applied to a case that the number of delay profiles to be selected is increased to three or more, as in the case of combining of the two delay profiles. However, because the noise increases if the number of beam-corresponding delay profiles to be selected/combined increases, it is not always effective.

The path timing detecting section 84 detects one or more path timings used in the receiving and demodulating section 2 based on the selected/combined delay profile. The path timing detecting section 84 selects timings of the path for larger levels from the delay profile in order, while taking the path selection interval of the 0.75- to 1-chip generally.

The beam selection signal generating section 85 generates amplitude components of the initial weights used in the weighting and combining section 36 of the path receiving section 3 from the levels of the selected/combined delay profile at each of the detected path timings. Specifically, when one beam-corresponding delay profile is selected by the delay profile selecting/combining section 83, the selection signal is generated in such a manner that the weight to the selected beam-corresponding delay profile is set to 1, and the weight to another beam-corresponding delay profile is set to 0. When two delay profiles are selected and combined by the delay profile selecting/combining section 83, the selection signal is generated in such a manner that the weight to the selected beam-corresponding delay profile is set to a value proportional to the level of the selected beam-corresponding delay profile, and the weight to another beam-corresponding delay profile is set to 0.

The receiving and demodulating section 2 generates the initial weights based on the path timings and the beam selection signal which are detected or generated as mentioned above, and carries out the adaptive demodulation for each path. That is, the receiving and demodulating section 2 is comprised of L path (#1 to #L) receiving section 3-1 to 3-L for the number of paths of the multi-path propagation route, a combining unit 4, a decision unit 5, a switch 6 and a subtractor 7, as mentioned above.

The path (#1 to #L) receiving sections 3-1 to 3-L have the same circuit structure and carry out the same operation. Therefore, the path receiving sections 3-i ($1 \leq i \leq L$) will be described below. The path receiving sections 3-i is comprised of a correlation unit 31-i, a weighting and combining section 32-i, a rake combining and weighting section 33-i, a normalizing section 34-i, a multiplier 35-i, and a weight adaptive control section 36-i, as mentioned above.

The correlation unit 31-i despread the beam-corresponding spread signals at the path timing to produce beam-corresponding despread signals. The weighting and combining section 32-i weights and combines the beam-corresponding despread signals outputted from the correlation unit 31-i using the weights peculiar to the user and generated adaptively. The rake combining and weighting section 33-i carries out a weighting operation to the output of the adaptive weighting and combining section 32-i for the paths #i to correct a phase change. Also, the rake combining and weighting section 33-i carries out the weighting operation for SINR after path combining to be maximum (the maximum ratio combining). In addition, the rake combining and weighting section 33-i estimates channel estimation signal.

The combining unit 4 adds the outputs of the rake combining and weighting section 33-1 to 33-L to carry out the path combining, and outputs a high quality demodulation signal. The decision unit 5 determines a transmission signal with a high transmission possibility from the demodulation signal. The switch 6 carries out a switching operation to use a known reference signal as a reference signal when there is the known reference signal, and to use the output of the decision unit 5 as the reference signal when there is not any known reference signal. The subtractor 7 subtracts the demodulation signal from the reference signal to generate an error signal. The error signal generated by the subtractor 7 is distributed to the path (#1 to #L) receiving section 3-1 to 3-L.

The normalizing section 34-i carries out a normalizing operation to the channel estimation signal estimated by the rake combining and weighting section 33-i. Here, the normalizing section 34-i may be omitted to reduce a calculation quantity.

The multiplier 35-i multiplies the error signal and the normalized path estimation signal. The weight adaptive control section 36-i updates the weights adaptively, using the outputs of the correlation unit 31-i and the output of the multiplier 35-i.

When the adaptive update of the weights is started to the new path, the initial weights are generated using the beam selection signal from the beam selection signal generating section 85. When the beam selection signal shows the selection of one beam pattern (that is, one is 1 and the other is 0), the beam selection signal is uses as the initial weight just as it is. When the beam selection signal shows the selection of a plurality of beam patterns (that is, plural ones are values which are not 0 and the others are 0), the two methods are thought of: one is a method of using the beam selection signal as the initial weight just as it is and the other method of adding phase data.

In case of calculation of the beam weights of the multi-beam former 1, if calculation of the weights is previously carried out in such a manner that the geometrical center of the array antenna has a 0 phase shift, the respective outputs of the multi-beam former 1 to one physical path are the same phase. Therefore, the beam selection signal may be used just as it is. However, there is a possibility that the selected/combined beam pattern is for a different physical path. Therefore, a method of estimating the phase of the selected beam pattern and adding a phase component to the beam selection signal can be thought of. For example, this phase estimation can be realized by carrying out channel estimation using the outputs of the correlation units 31-1 to 31-L. Moreover, a method of using the channel estimation signal just as it is instead of the beam selection signal, which is not 0, can be thought of.

FIG. 10 is a block diagram showing the circuit structure of the delay profile generating section 82 of for beam of FIG. 7. Referring to FIG. 8, the delay profile generating section 82 is comprised of a beam-corresponding in-phase averaging section 821, a beam-corresponding level detecting section 822 and beam-corresponding level averaging section 823. The beam-corresponding in-phase averaging section 821 vector-averages sequences of beam-corresponding despread signals from the sliding correlation unit 81 in the same phase. The beam-corresponding level detecting section 822 calculates the levels (amplitude or power) of the vector-averaged signals. The beam-corresponding level averaging section 823 carries out an optional time mean to the levels of the vector-averaged signals.

The beam-corresponding same phase averaging section 821 vector-adds beam-corresponding despread symbol signals while matching the phases of the beam-corresponding despread symbol signals, to substantially improve SINR. When modulation is carried out to the symbol signals, the above operation cannot be carried out if not removing the modulation. However, if using a known pilot signal, the in-phase addition can be carried out by removing the symbol modulation. When the number of symbol signals for the in-phase average is more, SINR can be improved largely. When there is a rapid phase change according to the fading and so on, the number of symbol signals for the in-phase average is limited. The average number of symbol signals and an average weighting method in the beam-corresponding in-phase averaging section 821 are optional.

Figure 11:
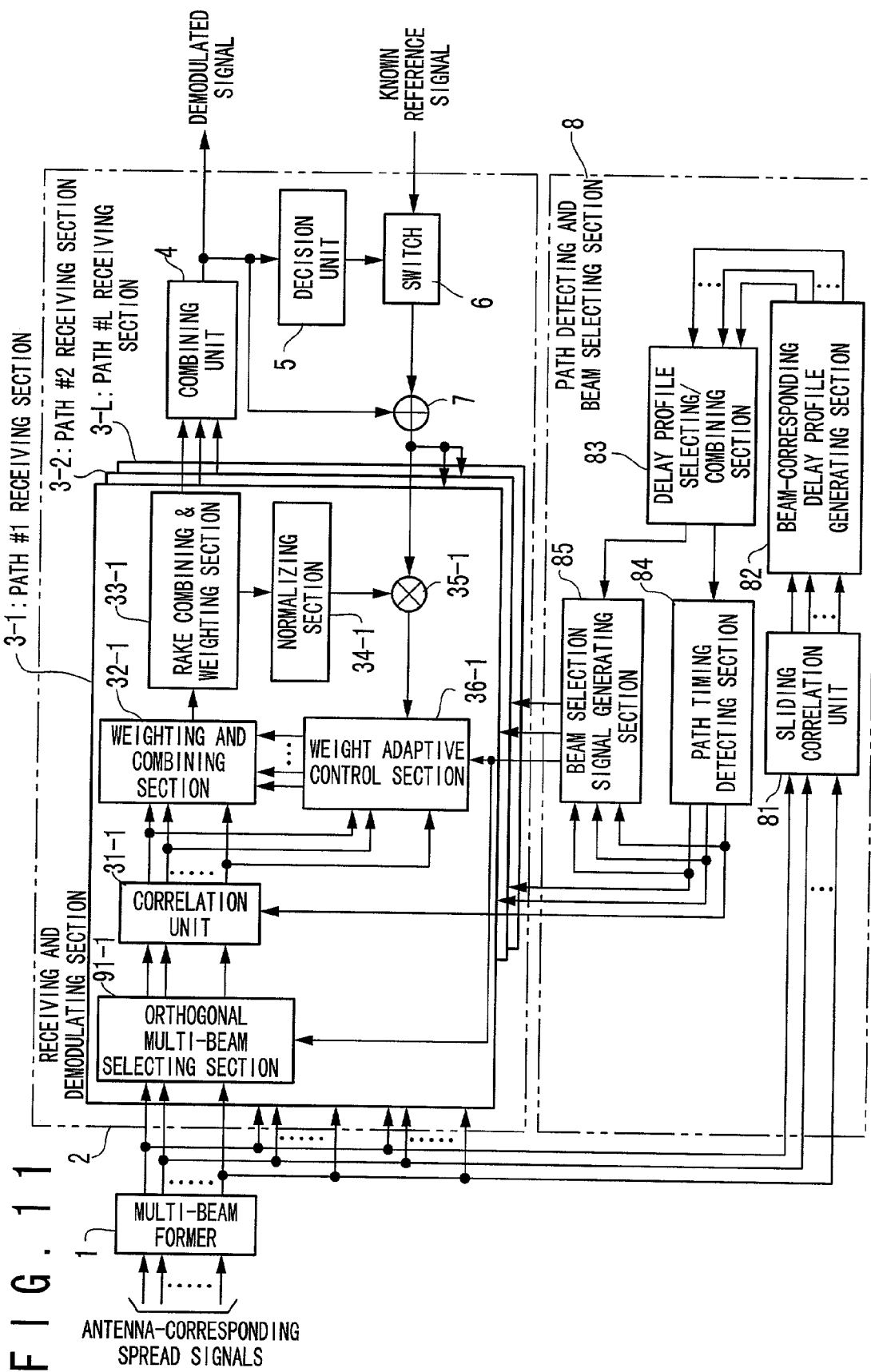
FIG. 11 is a block diagram showing the circuit structure of the adaptive antenna reception apparatus according to a third embodiment of the present invention.

FIG. 11 is a block diagram showing the circuit structure of the adaptive antenna reception apparatus according to the third embodiment of the present invention. Referring to FIG. 11, the adaptive antenna reception apparatus according to the third embodiment of the present invention has the same circuit structure as the adaptive antenna reception apparatus in the second embodiments of the present invention shown in FIG. 9, excluding that an orthogonal multi-beam group selecting section 91-i ($1 \leq i \leq L$) is added to the path (#1 to #L) receiving section 9-i. The same components as those in the third embodiments are allocated with the same reference numerals. The structures and operations of the same components are same as those in the second embodiment.

That is, the adaptive antenna reception apparatus according to the third embodiment of the present invention is comprised of the multi-beam former 1, the receiving and demodulating section 2, and the path detecting and beam selecting section 8. The multi-beam former 1 receives antenna-corresponding spread signals, when a CDMA (Code Division Multiple Access) signal has been received by antennas of an array antenna (not shown) to output a multi-beam signal of beam-corresponding spread signals. The receiving and demodulating section 2 receives the beam-corresponding spread signals, carries out a despreading operation for every path timing and outputs a demodulation signal through a weighting and combining operation. The path detecting and beam selecting section 8 receives the beam-corresponding spread signals, carries out the path timing detection and generates a beam selection signal to generate initial weights used for the path reception in the receiving and demodulating section 2.

The multi-beam former 1 receives the antenna-corresponding spread signals and outputs the beam-corresponding spread signals as the multi-beam.

The path detecting and beam selecting section 8 is comprised of a sliding correlation unit 81, a delay profile generating section 82, a delay profile selecting/combining section 83, a path timing detecting section 84, and a beam selection signal generating section 85.

The sliding correlation unit 81 carries out a despreading operation to the beam-corresponding spread signals over a plurality of chips in the resolution of 1/NR of the chip period (NR is a positive integer), and outputs sequences of beam-corresponding despreading signals. The delay profile generating section 82 generates beam-corresponding delay profiles, each of which is averaged for a predetermined time period using the sequences of beam-corresponding despreading signals outputted from the sliding correlation unit 81.

The delay profile selecting/combining section 83 produces one delay profile by selecting and adding one or more having larger levels for every timing of the M delay profiles. Also, the delay profile selecting/combining section 83 outputs level data of the selected/combined beam signal for every timing.

The path timing detecting section 84 detects one or more path timings used in the receiving and demodulating section 2 based on the selected/combined delay profile. The path timing detecting section 84 selects timings of the path for larger levels from the delay profile in order, while taking the path selection interval of the 0.75- to 1-chip generally.

The beam selection signal generating section 85 generates amplitude components of the initial weight used in the weighting and combining section 36 of the path receiving section 3 from the levels of the selected/combined delay profile at each of the detected path timings. Specifically, when one beam-corresponding delay profile is selected by the delay profile selecting/combining section 83, the selection signal is generated in such a manner that the weight to the selected beam-corresponding delay profile is set to 1, and the weight to another beam-corresponding delay profile is set to 0. When two delay profiles are selected and combined by the delay profile selecting/combining section 83, the selection signal is generated in such a manner that the weight to the selected beam-corresponding delay profile is set to a value proportional to the level of the selected beam-corresponding delay profile, and the weight to another beam-corresponding delay profile is set to 0.

The receiving and demodulating section 2 generates the initial weights based on the detected path timings and the beam selection signal which are detected or generated as mentioned above, and carries out the adaptive demodulation for each path. That is, the receiving and demodulating section 2 is comprised of the L path (#1 to #L) receiving section 9-1 to 9-L for the number of paths of the multi-path propagation route, the combining unit 4, the decision unit 5, the switch 6 and the subtractor 7.

The path (#1 to #L) receiving sections 9-1 to 9-L have the same circuit structure and carry out the same operation. Therefore, the path receiving sections 9-i (1≦i≦L) will be described below. The path (#1 to #L) receiving section 9-i is comprised of the orthogonal multi-beam group selecting section 91-i, the correlation unit 31-i, the weighting and combining section 32-i, the rake combining and weighting section 33-i, the normalizing section 34-i, the multiplier 35-i, and the weight adaptive control section 36-i.

The orthogonal multi-beam group selecting section 91-1 to 91-L selects an orthogonal multi-beam group containing the beam-corresponding signal for the maximum value of the beam selection signal outputted from the beam selection signal generating section 85, from among the beam-corresponding signal groups of the multi-beam former 1. In case that the multi-beam former 1 has only the orthogonal multi-beam shown in FIG. 5A, the orthogonal multi-beam group selecting section 91-1 to 91-L is unnecessary. Also, as shown in FIG. 5B, when the beams are arranged between the orthogonal multi-beams, the correlation exists between adjacent beam outputs. Therefore, the circuit structure becomes redundant when the weighting and combining operation is carried out using all beam outputs. The characteristic does not change in either of case where the weighting and combining operation is carried out to all the beam outputs or to the selected orthogonal multi-beam group. However, a subsequent calculation quantity can be greatly reduced by the multi-orthogonal beam group selecting section 91-1 to 91-L.

The correlation unit 31-i despread the beam-corresponding spread signals at the path timing to produce beam-corresponding despread signals. The weighting and combining section 32-i weights and combines the beam-corresponding despread signals outputted from the correlation unit 31-i using the weights peculiar to the user and generated adaptively. The rake combining and weighting section 33-i carries out a weighting operation to the output of the adaptive weighting and combining section 32-i for the paths #i to correct a phase change. Also, the rake combining and weighting section 33-i carries out the weighting operation for SINR after path combining to be maximum (the maximum ratio combining). In addition, the rake combining and weighting section 33-i estimates channel estimation signal.

The combining unit 4 adds the outputs of the rake combining and weighting section 33-1 to 33-L to carry out the path combining, and outputs a high quality demodulation signal. The decision unit 5 determines a transmission signal with a high transmission possibility from the demodulation signal. The switch 6 carries out a switching operation to use a known reference signal as a reference signal when there is the known reference signal, and to use the output of the decision unit 5 as the reference signal when there is not any known reference signal. The subtractor 7 subtracts the demodulation signal from the reference signal to generate an error signal. The error signal generated by the subtractor 7 is distributed to the path (#1 to #L) receiving section 3-1 to 3-L.

The normalizing section 34-i carries out a normalizing operation to the channel estimation signal estimated by the rake combining and weighting section 33-i. Here, the normalizing section 34-i may be omitted to reduce a calculation quantity.

The multiplier 35-i multiplies the error signal and the normalized path estimation signal. The weight adaptive control section 36-i updates the weights adaptively, using the outputs of the correlation unit 31-i and the output of the multiplier 35-i.

When the adaptive update of the weights is started to the new path, the initial weights are generated using the beam selection signal from the beam selection signal generating section 85. When the beam selection signal shows the selection of one beam pattern (that is, one is 1 and the other is 0), the beam selection signal is uses as the initial weight just as it is. When the beam selection signal shows the selection of a plurality of beam patterns (that is, plural ones are values which are not 0 and the others are 0), the two methods are thought of: one is a method of using the beam selection signal as the initial weight just as it is and the other method of adding phase data.

In case of calculation of the beam weights of the multi-beam former 1, if calculation of the weights is previously carried out in such a manner that the geometrical center of the array antenna has a 0 phase shift, the respective outputs of the multi-beam former 1 to one physical path are the same phase. Therefore, the beam selection signal may be used just as it is. However, there is a possibility that the selected/combined beam pattern is for a different physical path. Therefore, a method of estimating the phase of the selected beam pattern and adding a phase component to the beam selection signal can be thought of. For example, this phase estimation can be realized by carrying out channel estimation using the outputs of the correlation units 31-1 to 31-L. Moreover, a method of using the channel estimation signal just as it is instead of the beam selection signal, which is not 0, can be thought of.

Figure 12:
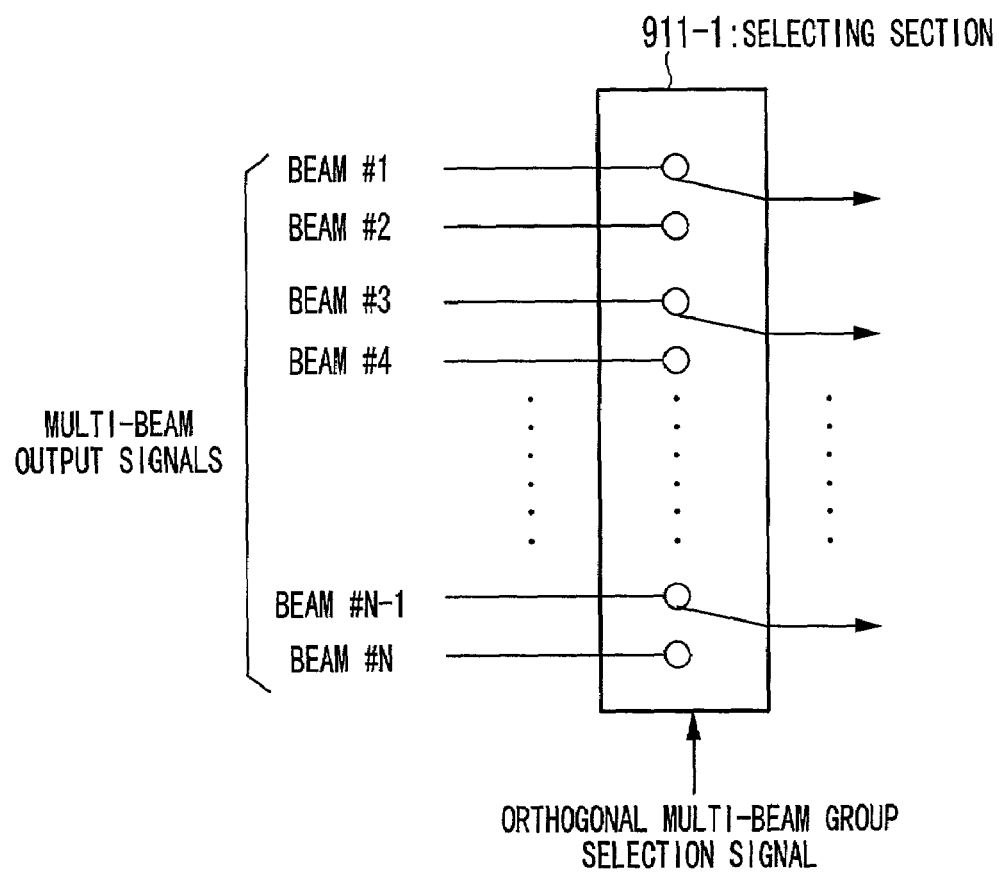
FIG. 12 is a block diagram showing the circuit structure of an orthogonal multi-beam group selecting section in the third embodiment of the present invention.

FIG. 12 is a block diagram showing the circuit structure of the orthogonal multi-beam group selecting section 91-1 in the path #1 of FIG. 11. In FIG. 12, the orthogonal multi-beam group selecting section 91-1 has a selecting section 911-1 which selects an orthogonal multi-beam group containing the beam for a maximum value of the beam selection signal outputted from the beam selection signal generating section 85, from among the beam output groups (beam #1 to #N) of the multi-beam former 1. It should be noted that although being not shown, the other orthogonal multi-beam group selecting section 91-2 to 91-L have the same circuit structure as the above-mentioned orthogonal multi-beam group selecting section 91-1.

In this way, by arranging the multi-beam former 1 prior to the despreading operation for every user and by forming a multi-beam in common to all the users, a calculation quantity can be largely reduced. Also, by carrying out the path detection and the beam selection using the beam-corresponding spread signals and the initial weights based on the beam selection signal, and the adaptive reception to maximize the reception SINR, the excellent path detection characteristic and reception demodulation characteristic can be realized.

Also, by selecting the orthogonal multi-beam group containing a beam for the largest level from the outputs of the multi-beam former 1 in the receiving and demodulating section 2, the subsequent calculation quantity can be greatly reduced.

As described above, according to the present invention, the adaptive antenna reception apparatus receives a code division multiple access (CDMA) signal by the array antenna and forms a directionality to each path. The reception apparatus receives the antenna-corresponding spread signal as the multi-beam signal and carries out a weighting and combining operation to the beam-corresponding despread signals for every path to correct a phase change, then combines the respective path signals, and adaptively updates the weights used in the weighting and combining by using the determination error signal obtained by the inverse correction of the phase change and the beam despread output. Thus, the calculation quantity can be greatly reduced. Also, the excellent path detection characteristic and reception demodulation characteristic can be realized.

What is claimed is:

1. An adaptive antenna reception apparatus comprising:
    a multi-beam former provided in common to a plurality of users, to convert antenna-corresponding spread signals received by antennas of an array antenna into beam-corresponding spread signals; and
    a receiving and demodulating section, which is provided for a user in said plurality of users, generates beam-corresponding correlation signals at path timings from said beam-corresponding spread signals, and generates path signals by weighting said beam-corresponding correlation signals with adaptive weights which are updated adaptively, and produces a demodulation signal for said user by combining said path signals.

2. The adaptive antenna reception apparatus according to claim 1, wherein said multi-beam former comprises:
    groups of former multipliers respectively provided for beam patterns of said array antenna, wherein each of said former multipliers of each of said groups multiplies one of said antenna-corresponding spread signals and a predetermined beam weight to produce said beam-weighted spread signal; and
    former combining circuits, wherein each of said former combining units is provided for said group to combine said beam-weighted spread signals of said group to produce one of said beam-corresponding spread signals.

3. The adaptive antenna reception apparatus according to claim 1, wherein said receiving and demodulating section comprises:
    receiving sections, each of which is provided for one of paths, generates said beam-corresponding correlation signals at said path timing from said beam-corresponding spread signals, generates one of said path signals for said path by weighting said beam-corresponding correlation signals with said adaptive weights, and updates said adaptive weights based on said beam-corresponding correlation signals and an error signal;
    a reception combining unit provided for receiving sections, to combine said path signals from said receiving sections to output said demodulation signal; and
    an error signal generating section which generates said error signal from said demodulation signal or a known reference signal to represent a difference between said demodulation signal and a transmission estimation signal from said one user or said known reference signal and distributes said error signal to said receiving sections.

4. The adaptive antenna reception apparatus according to claim 3, wherein said error signal generating section comprises:
    a decision section which determines said transmission estimation signal from said demodulation signal;
    a switch which selects as a reference signal, one of said known reference signal and said transmission estimation signal;
    a subtractor which subtracts said demodulation signal from said reference signal to generate said error signal and distributes said error signal to said receiving sections.

5. The adaptive antenna reception apparatus according to claim 3, wherein said receiving section comprises:
    a correlation unit which calculates correlations of said beam-corresponding spread signals at said path timing to produce beam-corresponding correlation signals;
    a weighting and combining section which weights said beam-corresponding correlation signals outputted from said correlation unit with said adaptive weights and combines weighted beam-corresponding correlation signals to produce a weighted path signal;

a rake combining and weighting section which carries out a weighting operation to the weighted path signal to correct a phase change to generate said path signal and estimates a channel estimation signal from the weighted path signal;

a reception multiplier which multiplies said error signal and said channel estimation signal; and a weight adaptive control section which updates said adaptive weights based on said beam-corresponding correlation signals and an output of said reception multiplier.

6. The adaptive antenna reception apparatus according to claim 5, wherein said receiving section further comprises:

a normalizing section which is provided between said rake combining and weighting section and said reception multiplier to carry out a normalizing operation to said channel estimation signal estimated by said rake combining and weighting section, and wherein said reception multiplier which multiplies said error signal and an output of said normalizing section in place of said channel estimation signal.

7. The adaptive antenna reception apparatus according to claim 5, wherein said weighting and combining section comprises:

weighting complex conjugate calculating circuits which calculate complex conjugates of said adaptive weights;

weighting multipliers which multiply said beam-corresponding correlation signals and the complex conjugates of said adaptive weights; and a weighting and combining circuit which combines outputs of said weighting multipliers into said weighted path signal.

8. The adaptive antenna reception apparatus according to claim 5, wherein said rake combining and weighting section comprises:

a channel estimating section which estimates said channel estimation signal from said weighted path signal;

a rake complex conjugate calculating circuit which calculates a complex conjugate of said channel estimation signal; and a rake multiplier which multiplies said weighted path signal and said complex conjugate of said channel estimation signal to produce said path signal.

9. The adaptive antenna reception apparatus according to claim 5, wherein said rake combining and weighting section comprises:

a channel estimating section which estimates said channel estimation signal from said weighted path signal;

a rake complex conjugate calculating circuit which calculates a complex conjugate of said channel estimation signal;

a first rake multiplier which multiplies said weighted path signal and said complex conjugate of said channel estimation signal to produce said path signal;

an interference power estimating section which calculates interference power from said weighted path signal;

an inverse value calculating section which calculates an inverse number of said interference power; and a second rake multiplier which multiplies an output of said first rake multiplier and an output of said inverse value calculating section.

10. The adaptive antenna reception apparatus according to claim 5, further comprises:

a path detecting section which detects said path timings from said beam-corresponding spread signals and outputs said path timing to said receiving sections.

11. The adaptive antenna reception apparatus according to claim 10, wherein said path detecting section comprises:

a sliding correlation unit which carries out a despreading operation to said beam-corresponding spread signals over a plurality of chips and outputs sequences of beam-corresponding despread signals;

a delay profile generating section which generates beam-corresponding delay profiles from said sequences of beam-corresponding despread signals;

a delay profile combining section which produces one delay profile by selecting and combining one or more of said beam-corresponding delay profiles; and a path timing detecting section which detects said path timings from said delay profile and outputs said receiving and demodulating section.

12. The adaptive antenna reception apparatus according to claim 3, wherein said weight adaptive control section sets initial data of said adaptive weights in response to a beam selection signal, and the adaptive antenna reception apparatus further comprises:

a path detecting section which detects said path timings from said beam-corresponding spread signals to outputs to said receiving sections, generates a delay profile and generates said beam selection signals from said delay profile and said path timings to output to said receiving sections.

13. The adaptive antenna reception apparatus according to claim 3, wherein said receiving section comprises:

an orthogonal multi-beam group selecting section which selects orthogonal ones from said beam-corresponding spread signals in response to a beam selection signal, said orthogonal beam-corresponding spread signals containing said beam-corresponding signal with a maximum level among said beam-corresponding spread;

a correlation unit which calculates correlations of said orthogonal beam-corresponding spread signals at said path timing to produce beam-corresponding correlation signals;

a weighting and combining section which weights said beam-corresponding correlation signals outputted from said correlation unit with said adaptive weights and combines weighted beam-corresponding correlation signals to produce a weighted path signal;

a rake combining and weighting section which carries out a weighting operation to the weighted path signal to correct a phase change to generate said path signal and estimates a channel estimation signal from the weighted path signal;

a reception multiplier which multiplies said error signal and said channel estimation signal; and a weight adaptive control section which sets initial data of said adaptive weights in response to said beam selection signal, and updates said adaptive weights based on said beam-corresponding correlation signals and an output of said reception multiplier.

14. The adaptive antenna reception apparatus according to claim 13, further comprises:

a path detecting section which detects said path timings from said beam-corresponding spread signals to outputs to said receiving sections, generates a delay profile and generates said beam selection signals from said delay profile and said path timings to output to said receiving sections.

15. The adaptive antenna reception apparatus according to claim 14, wherein said path detecting section comprises:
a sliding correlation unit which carries out a despreading operation to said beam-corresponding spread signals over a plurality of chips and outputs sequences of beam-corresponding despread signals;
a delay profile generating section which generates beam-corresponding delay profiles from said sequences of beam-corresponding despread signals;
a delay profile combining section which produces a delay profile by selecting and combining one or more of said beam-corresponding delay profiles, and outputs levels of said delay profile;
a path timing detecting section which detects said path timings from said delay profile and outputs said receiving and demodulating section; and
a beam selection signal generating section which generates said beam selection signals from the levels of said delay profile in response to said path timings from said path timing detecting section.

16. An adaptive antenna reception apparatus comprising:
a multi-beam former provided in common to a plurality of users, to convert antenna-corresponding spread signals received by antennas of an array antenna into beam-corresponding spread signals;
a receiving and demodulating section which is provided for a user in said plurality of users, and which generates beam-corresponding correlation signals at path timings from said beam-corresponding spread signals, and generates path signals by weighting said beam-corresponding correlation signals with adaptive weights which are updated adaptively, and produces a demodulation signal for said user by combining said path signals; and
a path detecting section which detects said path timings from said beam-corresponding spread signals and outputs said path timings to said receiving and demodulating section.

17. An adaptive antenna reception apparatus comprising:
a multi-beam former provided in common to a plurality of users, to convert antenna-corresponding spread signals received by antennas of an array antenna into beam-corresponding spread signals;
receiving and demodulating sections which are provided for said plurality users, and each of which generates beam-corresponding correlation signals at a path timing from said beam-corresponding spread signals, and generates path signals by weighting said beam-corresponding correlation signals with adaptive weights which are updated adaptively, and produces a demodulation signal for a user in said plurality users by combining said path signals, initial data of said adaptive weights being set in response to said beam selection signal; and
a path detecting section which detects said path timings from said beam-corresponding spread signals to outputs to said receiving and demodulating section, generates a delay profile and generates said beam selection signals from said delay profile and said path timings to output to said receiving sections.

18. The adaptive antenna reception apparatus according to claim 1, wherein said receiving and demodulating section comprises:
a correlation unit which calculates correlations of said beam-corresponding spread signals at said path timings to produce beam-corresponding correlation signals.

19. The adaptive antenna reception apparatus according to claim 18, wherein said receiving and demodulating section further comprises:
a weighting and combing section which weights said beam-corresponding correlation signals outputted from said correlation unit with said adaptive weights and combines weighted beam-corresponding correlation signals to produce a weighted path signal.

20. The adaptive antenna reception apparatus according to claim 19, wherein said receiving and demodulating section further comprises:
an error signal generating section which generates an error signal from one of said demodulation signal and a known reference signal;
a rake combining and weighting section which carries out a weight operation to the weighted path signal to correct a phase change to generate said path signal and estimates a channel estimation signal from the weighted path signal;
a reception multiplier which multiplies said error signal and said channel estimation signal; and
a weight adaptive control section which updates said adaptive weights based on said beam-corresponding correlation signals and an output of said reception multiplier.

* * * * *